US007756169B2

(12) United States Patent
Livingston et al.

(10) Patent No.: US 7,756,169 B2
(45) Date of Patent: Jul. 13, 2010

(54) DIFFRACTIVE METHOD FOR CONTROL OF PISTON ERROR IN COHERENT PHASED ARRAYS

(75) Inventors: Peter M. Livingston, Palos Verdes Estates, CA (US); Robert R. Rice, Simi Valley, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 122 days.

(21) Appl. No.: 12/009,935

(22) Filed: Jan. 23, 2008

(65) Prior Publication Data

US 2009/0185176 A1 Jul. 23, 2009

(51) Int. Cl.
*H01S 3/10* (2006.01)
(52) U.S. Cl. .................. 372/20; 372/26; 372/29.02; 372/102
(58) Field of Classification Search .............. 372/20, 372/26, 29.02
See application file for complete search history.

(56) References Cited

U.S. PATENT DOCUMENTS 6,118,562 A * 9/2000 Lee et al. .................. 398/1

2008/0085128 A1 * 4/2008 Rothenberg et al. ........ 398/188
2008/0253415 A1 * 10/2008 Livingston ............... 372/38.01

* cited by examiner

*Primary Examiner*—Dung T Nguyen
(74) *Attorney, Agent, or Firm*—Carmen Patti Law Group, LLC

(57) ABSTRACT

A high-power laser system includes a laser master oscillator, a plurality of fiber laser amplifiers producing intermediate output beamlets, a combiner for combining the intermediate beamlets into a combined output beam, and a piston error controller for minimizing errors related to beam combination that may degrade the quality of the combined output beam. A piston error controller processes a sample of the combined output beam using a Diffractive Optical Element to isolate a signal representing the total piston error of the combined beam. The controller uses amplitude modulation based on Hadamard code words to tag each non-reference intermediate beamlet with a unique code sequence orthogonal to those used for the other beamlets. For each intermediate beamlet, the associated piston error contribution is recovered using a Hadamard decoder. A very small phase dither is also introduced to allow the sign or direction of the piston error to be recovered. The decoded piston error contribution is processed by a cascaded product detector unit to derive a piston error control signal, which is provided to a phase modulator to thereby adjust the phase of a beamlet and minimize the piston error contributed thereby.

31 Claims, 10 Drawing Sheets

DIFFRACTIVE METHOD FOR CONTROL OF PISTON ERROR IN COHERENT PHASED ARRAYS

TECHNICAL FIELD

This invention relates generally to lasers, and more particularly to arrays of fiber laser amplifier in which multiple output beams from fiber amplifiers are combined to produce a higher-powered output beam.

BACKGROUND

Optical fiber laser amplifiers are a known technology for producing a coherent output beam of intermediate power. A variety of factors, including Stimulated Brillouin Scattering, four wave mixing, and optical damage, limit the output power of a single fiber amplifier to the range of several hundred watts. A laser of this power output may be useful in a variety of applications, but other applications require higher output power than that available from a single fiber amplifier. Even though the ultimate limit is unclear, it is virtually certain for physical reasons that the performance needed for envisioned defense and heavy industrial applications will not be achieved with a single fiber device.

Higher powered laser systems have been constructed by assembling an array of fiber amplifiers driven by a master oscillator. The output beams from each of the fiber amplifiers are coherently combined in the far field to produce a nominally single output beam. In general, in order for the combined beam to have good beam quality, the individual beams must be substantially parallel and collinear.

A variety of approaches have been used to combine the beams from multiple fiber amplifiers. Coherently combining the outputs of multiple fiber laser amplifiers configured in 2-D arrays is one attractive method for scaling up in power that has been successfully demonstrated over the past several years. In addition to requiring that combined beams be relatively parallel and collinear, coherent beam combination requires the precise control of the relative phases of the individual emitters in the array.

A known technique for combining beams emitted by fiber or solid state amplifiers uses a 2-D array of lenses—a "lenslet array"—to combine the Gaussian-like beams in the far field. It is preferable that all of the energy exiting the array be concentrated into a single beam or lobe. Accordingly, the lenslets are typically precision-manufactured on a single substrate, and are spatially close-packed to minimize the so-called array underfill and the resulting emitted power radiated into array side lobes. The beams from each of the lenslets must be pointed in the same direction to within a small fraction of the beam divergence as well, which is accomplished by careful active alignment and secure bonding in position. These considerations are managed by techniques and processes known in the art.

One additional factor controlling whether substantially all of the energy emitted in combined output beam appears in a single lobe is phase or "piston" error, which occurs when the constituent beamlets differ in optical phase. Piston error arises from various sources, including differences in the lengths of the optical paths of the several beamlets, thermal effects, and the like. Some of these error sources vary significantly and rapidly over time. Thus, is it necessary in coherent arrays to actively adjust the phase of each beamlet to form a diffraction limited beam in the far field comprising substantially a single lobe.

In a known type of phase-controlled coherent array, a reference signal is generated by a Master Oscillator (MO) which emits a narrowband signal that is amplified by the array. The signal is preamplified and split up into multiple beam lines, each of which includes an in-line phase modulator that serves to adjust the phase of that line and compensate fluctuations that arise in the amplifier for a variety of reasons. Each amplifier line also has a preamplifier, isolator, and power amplifier feeding a respective output transport fiber. Each of the output transport fibers is collimated by one of the lenslets in the aforementioned lens array. Each fiber preamplifier and power amplifier is pumped by a laser diode operating at a wavelength that is efficiently absorbed by the lasing dopant in the fiber core. The fiber amplifiers efficiently convert the pumping light from the laser diodes to high brightness output beams that must then be appropriately phased to produce a composite diffraction-limited beam for the entire array.

To measure and control phase of the individual beam lines in the known combined array system, a sample of the reference MO beam is frequency shifted by some amount, typically tens to a few hundred MHz, and used to form a collimated reference wavefront. A small sample of the outgoing array beam is combined through relay optics with the reference wavefront onto a photodetector array comprising N elements, where N is the number of fiber amplifiers being coherently combined. The optics are constructed such that each detector receives a signal from the frequency-shifted reference wavefront and a sample of the signal from only one fiber amplifier. The beat signal is at the heterodyne difference frequency and includes the dynamic phase of the fiber beam line which must be adjusted to a fixed constant value with respect to all the other fiber beams for proper operation. The instantaneous phase is extracted by signal processing algorithms and the in-line phase modulator is activated to drive the net phase to the desired value for array beam forming.

Although the aforementioned technique works successfully in smaller arrays, it requires a separate frequency-shifted reference line and a separate optical detector for each fiber in the array. It is expected that future high power arrays may combine a large number of elements—many tens or possibly a few hundred—and therefore the cost of the conventional phase control system can be unacceptably large. In addition, the weight, complexity, and robustness of the phase control equipment becomes unfavorable as the number of elements becomes large.

Thus, the need exists for a laser system that employs a plurality of fiber laser amplifiers, each producing an intermediate beamlet and all such intermediate beamlets being subsequently combined to form an output beam, which laser system provides improved control of piston error with respect to the intermediate beamlets, thereby maximizing the quality of the output beam and substantially concentrating its energy in a single lobe.

SUMMARY

An improved high-power laser system includes a laser master oscillator, a plurality of fiber laser amplifier chains producing intermediate output beamlets, a lenslet collimator array to combine the intermediate beamlets into a combined output beam, and a piston error detection and processing system for detecting and controlling piston error in the combined output beam. The signal from the laser master oscillator is distributed to each of the fiber amplifier chains. Each fiber amplifier chain includes an optically-pumped preamplifier which receives and amplifies the signal from the master oscillator, an interstage coupler which couples the signal from the preamplifier to the following stage, and an optically-pumped power amplifier. The output from each power amplifier is passed through a pump coupler which couples pumping energy into the amplifier, and is then supplied to a corresponding one of the lenslets of the collimator array. The collimator array collimates the several intermediate beamlets into a combined or composite output beam.

The piston error detection and processing system includes a beam sampler interposed in the output beam, a wedge array plate, a Diffractive Optical Element (DOE), a photodetector, an electrical processing part, and amplitude and phase modulators interposed at early positions in the amplifier chains. An additional half wave step may be provided in some of the beam lines. In the amplifier chain for each beamlet (other than a defined reference beamlet), there is interposed an amplitude modulator which receives a control signal from the electrical processing part, and responsively impresses on the beamlet a unique, digital, beamlet tagging or identification signal to enable the piston error contribution due to each beamlet to be distinguished from that of the other beamlets. The beam sampler produces a low-intensity sample of the combined output beam, which sample is directed to a wedge array plate. The wedge array plate directs to the DOE all the constituent beams of the output beam sample. The DOE produces a combined sample beam that exits the opposite face of the DOE from which the sample beamlets entered. The DOE, as discussed further in greater detail, has a property which causes energy to be emitted along defined angular displacements from a central lobe, corresponding to the diffractive orders of the DOE, when piston error is present. The DOE thus allows piston error to be detected by the presence of energy in so-called "satellite beams" outside of the central lobe. The photodetector receives the optical signals produced from the DOE and provides a corresponding electrical signal to the electrical processing part. The electrical processing part includes facilities to detect the beamlet identification signals, distinguish the respective piston error contributions due to each non-reference beamlet, and responsively produce a unique piston error correction signal for each non-reference beamlet. For each non-reference beamlet, the corresponding piston error correction signal is furnished to a respective phase modulator interposed in the beamlet to correct the piston error, thereby producing a single-lobed beam in the far field of the 2-D array.

A diffractive optical element (DOE) is a special type of coarse grating having a specifically designed grating profile or shape. An appropriately designed DOE is capable of combining the plurality of sampled intermediate beamlets into a single combined sample beam, provided that, inter alia: (1) the intermediate beamlets are incident on the DOE face at prescribed angles ("eigenangles") that represent the diffractive orders of the structure, as determined by physical characteristics of the grating and the wavelength of the beams being combined; and (2) the intermediate beamlets arrive at the DOE face in phase, or 180 degrees out of phase, according to a certain recipe. Deviation from either of these conditions causes the emission from the DOE of secondary or "satellite" beamlets which contain energy that otherwise would be contained in the central lobe. The fiber collimating lens array, the beam sampler, the wedge array, and the DOE are so arranged that the each of the sampled individual constituents of the combined output beam from the collimator array strike the wedge array and are deviated thereby so as to be incident on the 2-D DOE in one of the diffractive orders (i.e., along one of the prescribed angles). Accordingly, when all of the sampled beams are appropriately phased, only the beam corresponding to the central order will arrive at the photodetector. When phase or piston error is present in the sampled beam, the output of the DOE will also contain secondary or "satellite" beamlets emitted at angles corresponding to the higher diffractive orders. The output beam from the DOE strike the photodetector, which provides a responsive signal to the electrical processing part.

For each non-reference beamlet, a corresponding decoder determines the amount of piston error artifact contributed by such beamlet. The result is a per-beamlet signal proportional to piston error. For each beamlet, a cascaded pair of synchronous detectors followed by an integrator generate a piston error correction estimate. Each piston error correction estimate is summed with a small phase dither and supplied to a phase modulator to correct the piston error. The phase dither allows the direction of the phase error to be determined.

The beamlet tagging signal may be produced by associating with each beamlet one or more unique code words or vectors from a Hadamard dictionary, replacing code vector elements of value 0 with the value −1, and selecting in turn individual elements of such code vector to control the modulator on a periodic basis. As is known in the art, a Hadamard code vector is orthogonal to all other non-identical Hadamard code vectors. As modified above, the sum of the elements in a Hadamard code vector is zero, and any two such vectors are orthonormal after normalization. These properties allow a signal encoded with a Hadamard code vector to be distinguishably decoded in the presence of other such signals.

The piston error control system advantageously controls phase error in the combined output beam exiting the collimator array, thereby maximizing the energy in the primary combined output beam and improving beam quality. The piston error control system is relatively resistant to crosstalk among beamlets; if crosstalk is present, due to the nature of the controllers as first-order servo-loops, the error will eventually converge to zero, albeit perhaps at a slower rate.

DESCRIPTION OF THE DRAWINGS

Features of example implementations of the invention will become apparent from the description, the claims, and the accompanying drawings in which:

DETAILED DESCRIPTION

Figure 1:
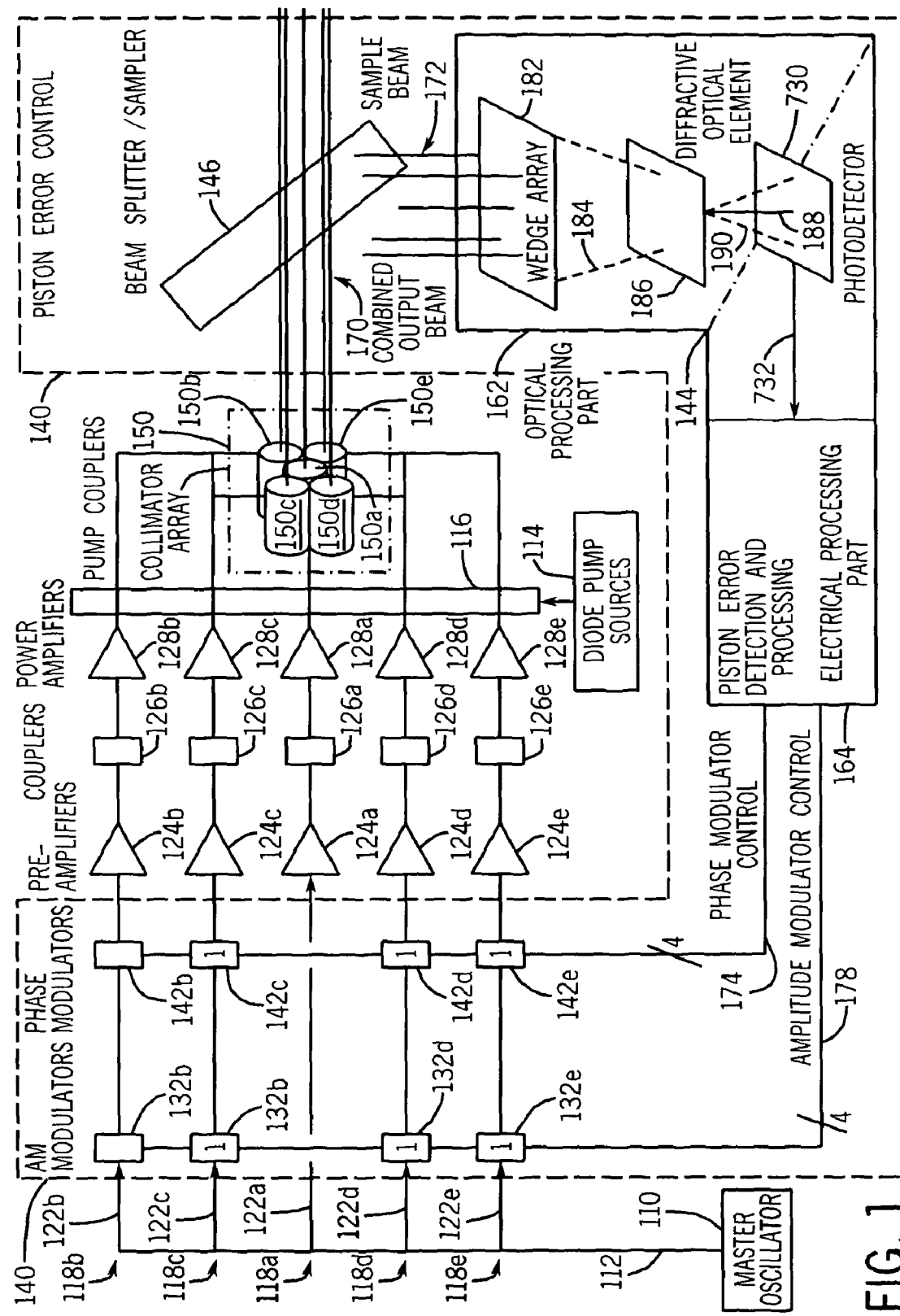
FIG. 1 is a block diagram of an example embodiment of a laser system 100 constructed according to an aspect of the present invention, in which a plurality of fiber laser amplifiers are used to amplify the beam from a master oscillator laser, and the outputs of the fiber laser amplifiers are combined.

FIG. 1 is a block diagram of an example embodiment of a laser system 100 constructed according to an aspect of the present invention, in which a plurality of fiber laser amplifiers are used to amplify the beam from a master oscillator laser, and the outputs of the fiber laser amplifiers are combined. The laser apparatus, control systems, and associated methods described herein are depicted in the application environment of a laser system employing multiple fiber laser amplifiers and a collimator lenslet array beam combiner, by way of example but not limitation, to show how challenges encountered in combining multiple beams may be overcome. However, one of skill in the art will appreciate that the control systems could also be advantageously applied to lasers using other beam combination technology, and more generally to other laser types, in environments not limited to fiber lasers, without modification or with modifications within the ken of a person of skill in the art, consistent with the spirit of the invention.

The present application relates to lasers and control systems therefor, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the laser and control system arts, various signal leads, busses, data paths, data structures, channels, buffers, message-passing interfaces, free-space optical paths, fiber optical paths, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

As best seen in FIG. 1, the laser system 100 preferably includes a master oscillator laser 110, a plurality of fiber amplifier chains 118a-118e, a piston error control system 140, and a collimating lenslet array 150, optically coupled in sequence, to produce a combined output beam 170.

The master oscillator laser 110 may be any suitable laser adapted to provide an output beam which has a desired wavelength for the application and which is compatible with fiber amplifier chains 118a-118e. Master oscillator laser 110 preferably is relatively stable and has a narrow bandwidth output spectrum within the amplification passband or gain bandwidth of the fiber amplifier chains 118a-118e. By way of example but not limitation, master oscillator laser 110 may be a solid state Neodymium-doped Yttrium-Aluminum-Garnet (Nd:YAG) laser of conventional design operating at a wavelength of 1060 nm. Such lasers are available from commercial sources. Other types of laser may be used as master oscillator 110. The wavelength selected for master oscillator laser 110 and fiber amplifier chains 118a-118e controls certain physical parameters of other portions of the laser system 100, as discussed further in greater detail. However, if those parameters are taken into account, the general structure of the laser system 100 described herein is suitable for use with a wide range of wavelengths, corresponding to a range including at least the far infrared through the ultraviolet.

The master oscillator laser 110 is coupled to fiber amplifier chains 118a-118e via master oscillator distribution path 112, which may be any appropriate optical path, including free space optics. One or more beam-splitters (not shown) may be provided to divide the master oscillator output beam for use by the several fiber amplifier chains. The effective optical path length of master oscillator distribution path 112 to each of the fiber amplifier chains 118a-118e is preferably nearly identical (or at least the remainders after integral numbers of whole wavelengths are subtracted are preferably identical) to minimize the phase error of the signal supplied at the input of each amplifier chain. Path matching components (not shown) may be provided in one or more of the fiber amplifier chains 118a-118e to equalize, or at least adjust, the effective optical delay remainders; the path matching components may be implemented, for example but without limitation, using optical delay plates, which are known in the art and commercially available.

Each of the fiber amplifier chains 118a-118e processes a corresponding beam line, eventually producing as an output an intermediate beamlet. Each beam line and the associated intermediate beamlet are referred to using the same reference characters 122a-122e. The beam lines are, in effect, the optical pathways interconnecting the components of the fiber amplifier chain, and may be implemented using one or more of optical fiber, free-space optics, and any other appropriate technology. By way of example, but not limitation, laser system 100 as described herein has five fiber amplifier chains 118a-118e, but a different number of fiber amplifier chains could also be used, and the arrangement disclosed herein may be scaled to accommodate many tens or hundreds of amplifier chains. Such scaling may require small modifications within the ken of those of ordinary skill in the art. The number of amplifiers required depends on several factors, including the output power desired and the design of a diffractive optical element (DOE) component 186 of the piston error detection and processing system 144 (described further in greater detail). The DOE 186 is generally designed to accommodate a specific, odd number of beamlets.

One of the beam lines/beamlets 122a is defined as a "reference beamlet," and all other beam lines/beamlets 122b-122e are considered "non-reference beamlets". For the purpose of piston error control, the phases of the non-reference beamlets 122b-122e are compared with and adjusted to match the phase of the reference beamlet 122a. In further discussion, the reference character "a" is used to identify the reference beamlet and items associated therewith, and the reference characters "b-e" are used to identify the non-reference beamlets and items associated therewith. Because the piston error control system 140 generally operates only on the non-reference beamlets 122b-122e, there is usually no element corresponding to reference character "a".

Each of the fiber amplifier chains 118a-118e includes a preamplifier 124a-124e, an inter-stage coupler 126a-126e, a power amplifier 128a-128e, and appropriate couplers shown generally as 116 for coupling energy from a pump energy source 114 into the power amplifiers 128a-128e. Although the fiber amplifier chains 118a-118e each include plural amplifiers and other components, this particular structure is not essential, and these amplifier chains could in some applications be implemented using discrete amplifiers. Moreover, when topics other than particular structure or arrangement of an amplifier chain is not under consideration, it may be useful to consider each amplifier chain as simply an amplifier.

Preamplifiers 124a-124e are preferably any suitable optically-pumped fiber laser amplifiers, selected for compatibility with the output signal from the master oscillator laser 110, and for a desired power output. By way of example, but not limitation, the preamplifiers 124a-124e may be constructed as two-stage preamplifiers having an output power of around 3 W. Preamplifiers of this type are generally designed for a specific wavelength and have a gain bandwidth of a small fraction of a wavelength. The preamplifiers may be implemented, for example but not limitation, as pumped fiber amplifiers using pumping energy from laser diode sources (not shown). Preamplifiers of this type are available from commercial sources. [QUESTION FOR INVENTORS: The disclosure mentions a part or type number of "PM 3 W". Does that refer to a special amplifier, the selection of which may be worthy of mention?] Other amplifier types and arrangements could also be used. The preamplifiers 124a-124e are coupled to power amplifiers 128a-128e via inter-stage couplers of conventional design. [QUESTION FOR INVENTORS: Is there more we can describe about these couplers and their function?]

Power amplifiers 128a-128e are preferably any suitable optically-pumped fiber laser amplifiers, selected for compatibility with the operating wavelength of the system, the output signal from the preamplifiers 124a-124e, and for a desired power output. Amplifiers of this type are generally designed for a specific wavelength and have a gain bandwidth of a small fraction of a wavelength. Suitable amplifiers are available from commercial sources. Pump couplers, shown generally as 116, couple optical pumping energy from pumping energy sources 114. Any suitable pumping energy sources may be used. For example but without limitation, the pumping energy sources may be laser diodes operating at a wavelength that is efficiently absorbed by the lasing dopant in the amplifier fiber core.

Each of fiber amplifier chains 118a-118e produces a respective intermediate output beamlet 122a-122e, which may be any suitable optical path, including without limitation a free-space optical path. The output beamlets are subject to a several errors which, uncorrected, cause the production of secondary or "satellite" outlet beamlets following combination, or otherwise reduce the quality of the combined output beam 170. [QUESTION FOR INVENTORS: Is this correct for a non-DOE beam combiner?] "Piston error" is, in essence, a phase displacement of an amplifier's intermediate output beamlet with respect to others. Piston error may arise from mechanical differences between amplifiers, including but not limited to variations in fiber length and other dimensional parameters, anomalies in fiber or coupler construction, and thermal differences. Although it is preferable to have zero piston error, in general, piston errors of less than a milliradian will provide acceptable performance of laser system 100.

Each of the intermediate beamlets 122a-122e is furnished to a corresponding element 150a-150e of a collimator array 150. Preferably, the reference beamlet 122a is assigned to the central element 150a of the collimator array 150. Collimator array 150 may, for example, be constructed as a precision-manufactured 2-D array of collimating lenslets on a single substrate. Where the intermediate beamlets 122a-122e are transported to the collimator array via optical fiber, a fixture secures the end of the fiber to precisely align the end of the fiber with respect to the corresponding lenslet. Lenslet arrays of this type are known in the art. Other collimating array arrangements could also be used. The collimating array causes produces a composite output beam 170, which is combined in the far field area. In the vicinity of the collimator array 150, the individual components of the output beam 170 are spaced by a small distance due to the spacing of the lenslets and the thickness of the fibers.

In accord with a further aspect of the present invention, in order to correct piston error, laser system 100 preferably includes a piston error control system 140 which modifies one or more of the fiber amplifier output intermediate beamlets 122 to minimize this type of error. Although all beamlets may be so modified, it may reduce cost and system complexity to leave the reference beamlet 122a unmodified by the piston error control system, and to modify the remaining non-reference beamlets 122b-122e to minimize error with respect to the assigned reference beamlet 122a.

Each of the fiber amplifier output intermediate beamlets 122 other than that selected as the reference beamlet may be modified for error minimization purposes. AM modulators 132b-132e are preferably interposed in the paths of intermediate beamlets 122b-122e to impose a beam tagging signal needed by piston error control system 140 measure and distinguish the piston error associated with each intermediate beamlet. Phase modulators 142b-142e are preferably interposed in the paths of intermediate beamlets 122b-122e prior to preamplifiers 124b-124e to allow piston error control system 140 to measure and distinguish the piston error associated with each intermediate beamlet, and to adjust the phase of each intermediate beamlet to minimize the piston error. AM modulators 132b-132d and phase modulators 142b-142d could instead be interposed at any other location in the beam lines 122b-122e prior to the collimator array 150, such as between the preamplifiers 124b-124e and the power amplifiers 128b-128e, or after the power amplifiers 128b-128e.

The piston error control system 140 includes a sampling beam splitter 146, a piston error detection and processing unit 144, the earlier-mentioned plurality of phase modulators 142b-142e, one interposed in each of the beamlets 122b-122e other than the selected reference beamlet 122a, and the earlier-mentioned plurality of AM modulators 132b-132e1, each also interposed in a corresponding one of the non-reference beamlets 122b-122e.

In brief, the piston error detection and processing unit 144 receives the sample of combined output beam 170 from piston error sampling beam splitter 146 over path 172. The piston error detection and processing unit 144 supplies phase modulator control signals via bus 174 to the respective phase modulators 142b-142e. A separate phase modulator control signal is provided for each of phase modulators 142b-142e. Each of the phase modulator control signals 174 includes a piston error control component, unique to the respective phase modulator, and a dither component which is also unique to the respective modulator. The phase dither allows the direction of the phase error to be determined.

For each beamlet, a signal containing information of its piston error contribution is supplied to a respective cascaded pair of product detectors followed by an integrator; the integrator value is used to produce a proportional signal to control a respective one of phase modulators 142b-142e to adjust the phase and thereby correct the piston error. Thus, piston error control system 140 forms a first order or Type I servo loop for each non-reference beamlet which drives to zero the piston error contributed by that beamlet. The terms "first order" and "Type I" refer to a set of servo loop properties well known to persons of skill in the art of control systems. The servo loops referred to herein have the "first order" and "Type I" properties, and these terms are used interchangeably herein.

Any suitable optical phase modulator may be used to implement phase modulators 142*b*-142*e*. By way of example but not limitation, each of phase modulators 142*b*-142*e* may be implemented using a Pockel's Cell phase modulator. The phase modulator receives an electrical signal; internally, the phase modulator has a refractive index that varies with an applied electric field. The phase modulator thus provides a variable phase delay which can be used to correct piston error. The magnitude of dither phase modulation is preferably limited to a small value, such as a few degrees of phase, in order to limit degradation of the far-field beam quality. Although processing circuits and phase modulators suitable for correcting piston errors associated with four beamlets 122*b*-122*d* are described and shown herein, any number of processing circuits and phase modulators could be used as needed to accommodate the number of beamlets to be corrected (excluding the designated reference beamlet.

The piston error detection and processing unit 144 also provides for each non-reference beamlet a unique respective beam tagging control signal via path 178 to a corresponding one of AM modulators 132. The control signals cause the AM modulators to modulate each of the non-reference beamlets 122*b*-122*e* with an appropriate unique tagging or identification signal, such that piston error associated with such beamlet can be measured by piston error detection and processing unit 144 and distinguished from the piston error associated with all other beamlets. The generation of the unique tagging or identification signal is described further in greater detail (see FIGS. 8-9 and the description thereof). AM modulators 132*b*-132*e* may be implemented using any suitable modulator technology, including but not limited to a Mach-Zehnder interferometer. Such interferometers are available from commercial sources.

Figure 4:
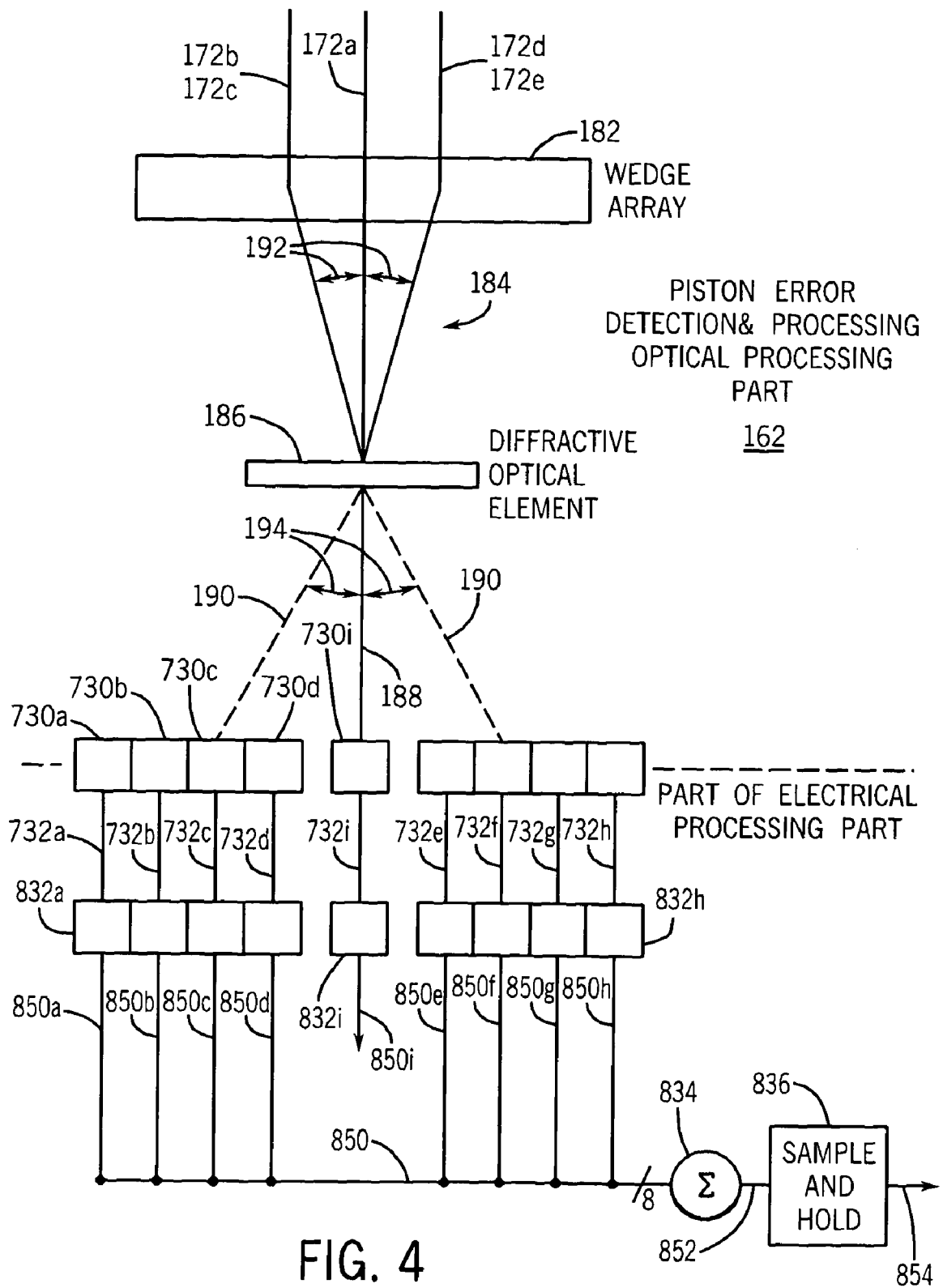
FIG. 4 is a block diagram of a first portion of an example piston error detection and processing unit 144 for use in conjunction with the laser system 100 of FIG. 1.
Figure 5:
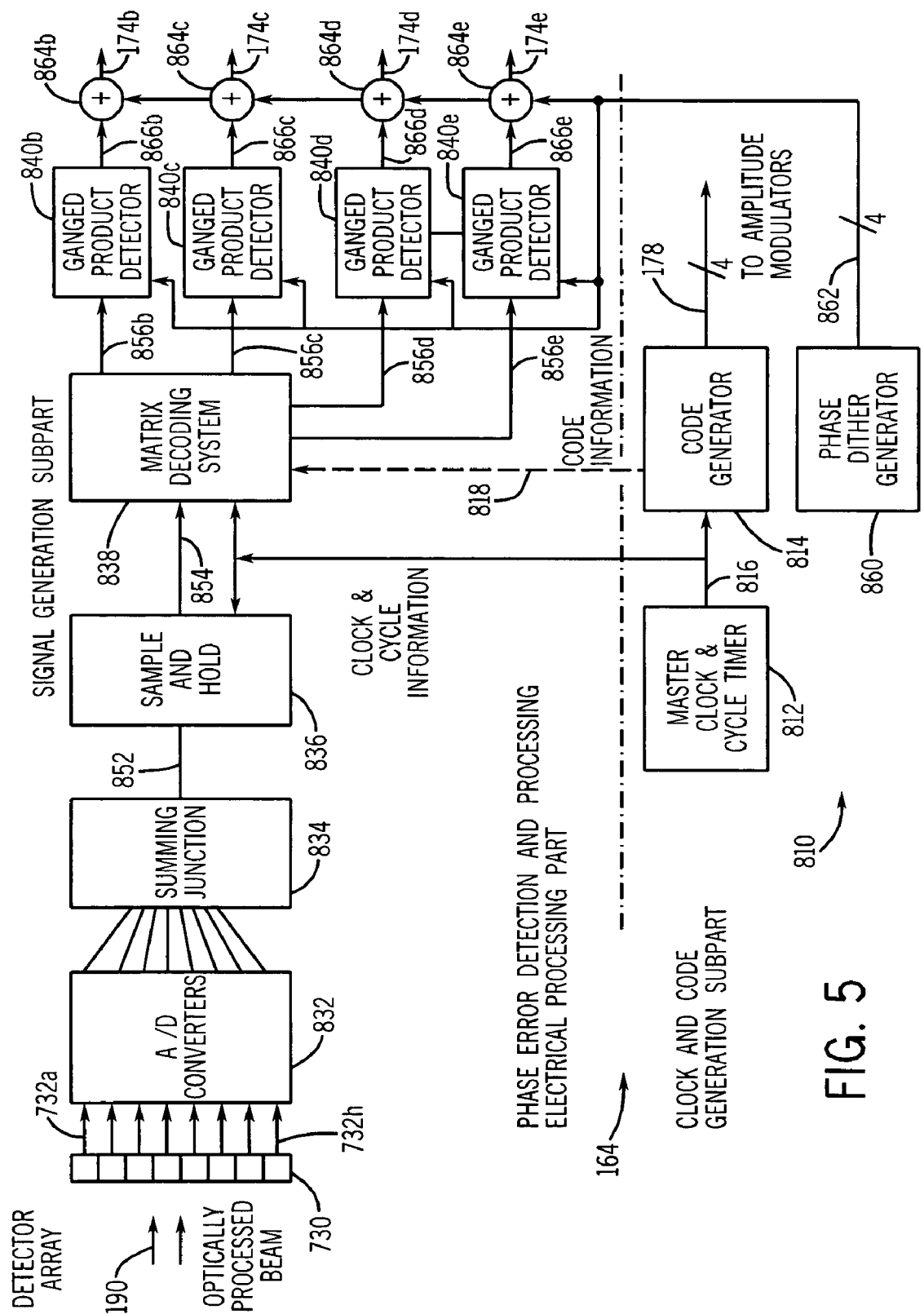
FIG. 5 is a block diagram of a second portion of an example piston error detection and processing unit 144 for use in conjunction with the laser system 100 of FIG. 1.

FIGS. 4 and 5 in partially-overlapping combination form a block diagram of the piston error detection and processing unit 144. FIG. 4 depicts the optical processing part 162 and a portion of the electrical processing part 164 of unit 144. The elements of FIG. 4 generally encompass the acquisition and initial processing of a signal representing the combined piston error contributions of all beamlets. FIG. 5 depicts the electrical processing part 164, including elements which decode and distinguish the piston errors contributed by each of the beamlets and produce piston error correction signals used to control the phase modulators 142.

As best seen in FIGS. 1 and 4, the optical processing part 162 of piston error detection and processing unit 144 includes a beam splitter/sampler 146 which extracts a piston error sample beam 172. Any suitable beam splitter may be used as beam splitter 146, including without limitation a partially silvered mirror. Only a small fraction of the combined output beam 170 need be collected as a sample. Components of the sample beam 172 include samples 172*a*-172*e* of each of the constituent beamlets forming combined output beam 170, and are generally arranged in the pattern similar to that of the collimating array 150. Because FIG. 4 is a side view, beamlet sample 172*b* is shown overlapping beamlet 172*c*, and beamlet 172*d* is shown overlapping beamlet 172*e*. A wedge array 182 receives the sample beam 172 and diverges each constituent beamlet toward a Diffractive Optical Element (DOE) 186 along incident angles 192 (with respect to axes normal to the face of the DOE) selected according to the DOE geometry and the operating wavelength of the laser system 100. The diverged beams are generally shown as 184. [QUESTION FOR INVENTORS: Please describe briefly the structure of the wedge array and identify any important characteristics. Is this a commercial product?]

Diffractive optical element (DOE) 186 combines the sample beamlets amplifier output intermediate beamlets 122*b*-122*e* into a combined output beam 170. DOE 186 is a special type of grating having a grating surface shape (i.e., grooves) constructed according to a particularly designed grating function. A DOE differs from a conventional grating in that the DOE grating is coarser (i.e., the spatial frequency of the grooves of the DOE is much lower), and the shape of the grooves in the DOE surface is important. The product of grating line frequency (lines/cm) multiplied by the light wavelength (cm) defines a characteristic angle or 'eigenangle,' expressed in radians. Beamlets must be incident on the DOE at angles 192 equal to plus or minus the eigenangle (as measured from the grating normal), or in plus or minus simple integer multiples of the eigenangle in order that the beamlets be combined into a single output beam exiting from the opposite side of the DOE.

Figures 2, 3:
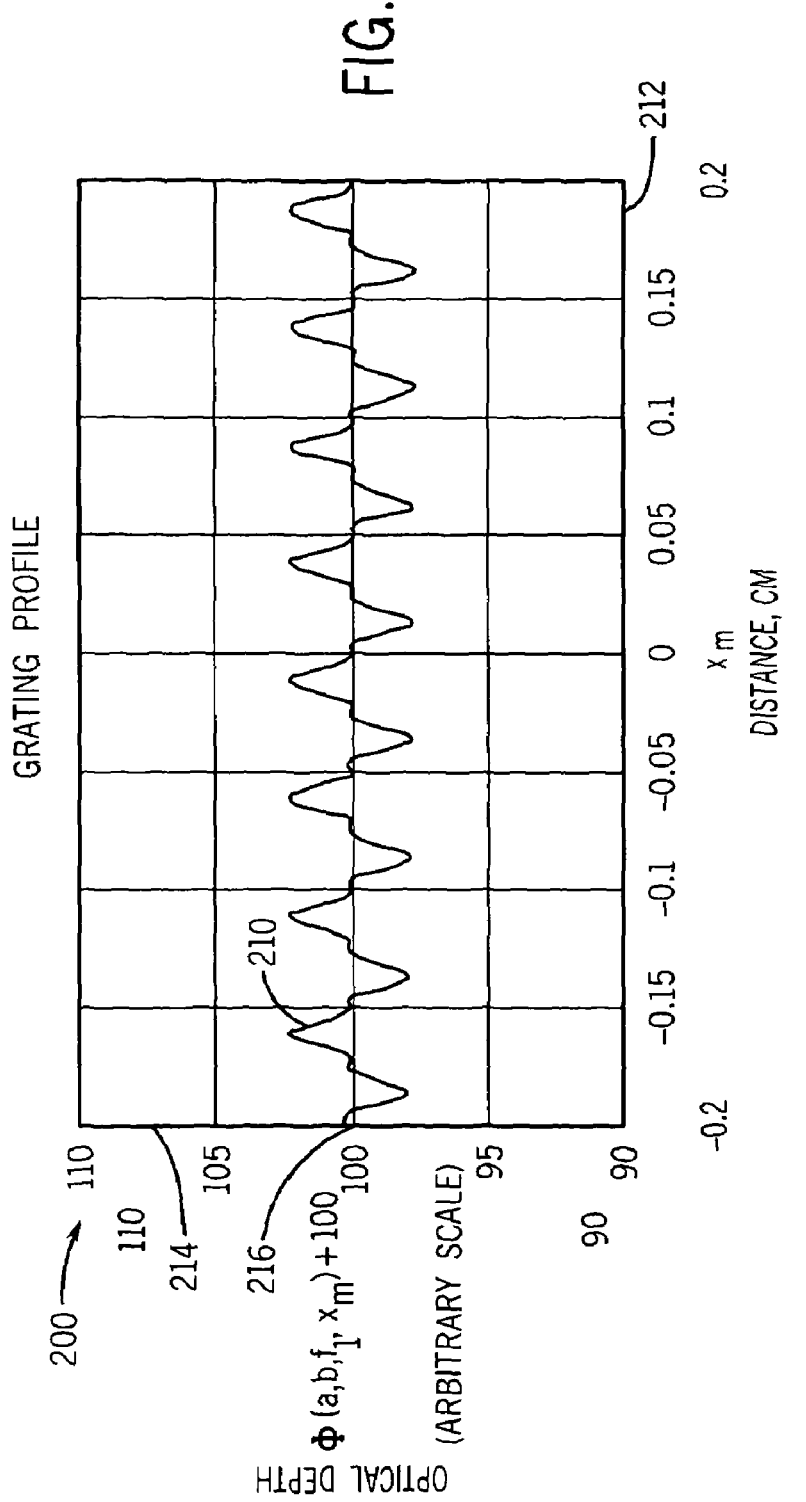
FIG. 2 is a graph 200 depicting a grating profile 210 for an example embodiment of a diffractive optical element (DOE) 150 which may be used in the laser system 100 of FIG. 1.
FIG. 3 depicts two equations which define physical characteristics of the DOE 150 of FIG. 1-2.

FIG. 2 is a graph 200 depicting a grating profile 210 for an example embodiment of a DOE 168 which may be used in laser system 100. The grating profile shown in FIG. 2 is, in essence, a cross section view through the DOE 150 along an axis perpendicular to the grooves of the DOE. The aforementioned perpendicular axis is represented as the abscissa or X-axis 212 of graph 200. The grating profile 216 is depicted as the surface boundary position or relative optical depth, proportional to the substrate index of refraction. The scale is chosen to reveal the groove profile, but is otherwise arbitrary, as measured by the ordinate or Y-axis 214.

FIG. 3 depicts two equations which define physical characteristics of the DOE. The grating profile 210 is defined by a grating profile function 312. Function 310 defines a grating transmission function. The far-field pattern of the DOE is equal to the Fourier transform of the sum of the incident electric fields, each one multiplied by the grating transmission function. As best seen in FIG. 2, the fundamental line spacing, or spatial frequency of the DOE is F0=20 lines per cm. This is very small compared to that of conventional gratings (typically 10000-70000 lines per cm.). The grating function 312 has a first term varying at a first frequency (F0), and a second term varying at a frequency F1=3F0 with coefficients indicating the ruling optical depth at the operating optical wavelength. The particular shape of the grating profile is important to the beam combining function; deviations will degrade or completely eliminate the ability of the DOE to combine the intermediate beamlets. The coefficients in the grating profile have been selected to minimize stray power in secondary exit lobes.

The separation interval 192 between adjacent eigenangles is defined by the product of the wavelength of the beams being combined and the spatial frequency of the DOE. For the example DOE 186 defined by DOE grating profile function 312, operating at a wavelength of 1060 nm, the interval between adjacent eigenangles is 2.128 mrad. Although the grating profile function 312 of FIG. 2-3 is suitable for a range of wavelengths, if significantly shorter wavelengths are used while holding the DOE spatial frequency constant will result in small eigenangle separation intervals, which may make it difficult or impossible to properly arrange the intermediate beamlets to strike the DOE 186 at the correct incident angles. Thus, it may be necessary to increase the spatial frequency of the grating to accommodate intermediate beamlets of shorter wavelengths. The design of suitable diffractive optical elements has been well described in technical literature, and suitable DOEs are available from commercial sources. It is believed that current technology allows the construction of DOEs having a desired grating profile shape with a spatial frequency as high as 10000 rules per cm, and therefore the spatial frequency of available DOEs is unlikely in practice to be a factor limiting the practical application of this beam combination apparatus for shorter wavelengths.

DOEs may be constructed in several configurations, notably 1-D configurations, having a pattern of linear grooves, and 2-D configurations, having two crossed patterns of grooves. For a DOE having linear grooves, the input beamlets generally must be incident on the grating in a fan-like radial pattern within a plane normal to the major surface of the DOE and perpendicular to the grooves, wherein adjacent beamlets are radially displaced from one another by the aforementioned consistent angular increment which is a function of the grating spatial frequency and the wavelength. For a DOE having a crossed (2-Dimensional) pattern of grooves, the input beamlets generally must be incident on the grating in a converging pin-cushion-like pattern, wherein adjacent beamlets are displaced in each of two dimensions by the aforementioned consistent angular increment. Where beamlets $122a$-$122e$ are collimated in a 2-D pattern, as generally shown in FIG. 1, a 2-D DOE may be most suitable because the required input pattern may more closely match the pattern of the sample beam 172. In some applications, it may be desirable to construct the combined output beam 170 using a linear array of collimators; where such arrangements are used, a linear DOE may be preferred. [QUESTION FOR INVENTORS: Is this paragraph correct?]

DOE 186 produces a combined output beam 188 that exits the opposite face of the DOE 186 from which the beamlets entered. Uncorrected piston error in the laser system combined output beam 170, and therefore in the beamlets furnished to DOE 186, appear as secondary or satellite beam components 190 which exit from the DOE at angles displaced from the main lobe by the consistent angular increment defined by the geometry of the DOE and the wavelength in use. Although the secondary or satellite beam components are schematically represented by lines 190, several secondary beamlets may emerge from the DOE at any of the eigenangles defined by the DOE geometry and the wavelength of light being used. Although secondary or satellite beam components could also result from tilt error (i.e., error arising from angular misalignment of the incident beams with respect to the diffractive-order-defined angles of the DOE), for the purpose of this description, it is assumed that tilt error has been corrected, so that any uncorrected tilt error artifacts are insignificant. The satellite or secondary beam components 190, to the extent present, appear as optical upper and lower sidebands on either side of the central lobe 188.

A detector 730 receives the output from DOE 186, including the central lobe 188 and any secondary or satellite beams. The detector may generally be considered to be a square-law device for measuring the intensity or power of the beam on particular areas or locations of the detector. Advantageously, the optical processing part 162 of the piston error detection and processing unit 144 does not employ an interferometer or similar structure, and may be considered "interferometer-free".

The detector array 730 may be any suitable array of detector elements employing any appropriate detector technology. For example, the detector array 730 may employ a plurality of detector elements $730a$-$730h$ (see FIGS. 4, 5, and 7) arranged in a pattern that captures at least some of the energy that will be present if secondary beamlets are present by virtue of piston error. In general, this means that the detector array must be constructed in a pattern that at least partially matches or overlaps that of the secondary beamlets. Thus, a two-dimensional detector array could be required. The appropriate inter-element spacing of detector elements $730a$-$730h$ for a particular embodiment varies depending on the length of the optical path between the DOE and the detector array.

The inter-element spacing is determined by the expected spread of satellite beamlets and the distance from the DOE. Assume that any lenses following the DOE form a telescope with unity magnification. For a beamlet separation of 2.128 milliradians, satellite beamlets will be spaced by about 106 microns if the detector plane is 5 cm from the DOE. Hence the detector pitch (element spacing) is about 100 microns.

Figure 7A:
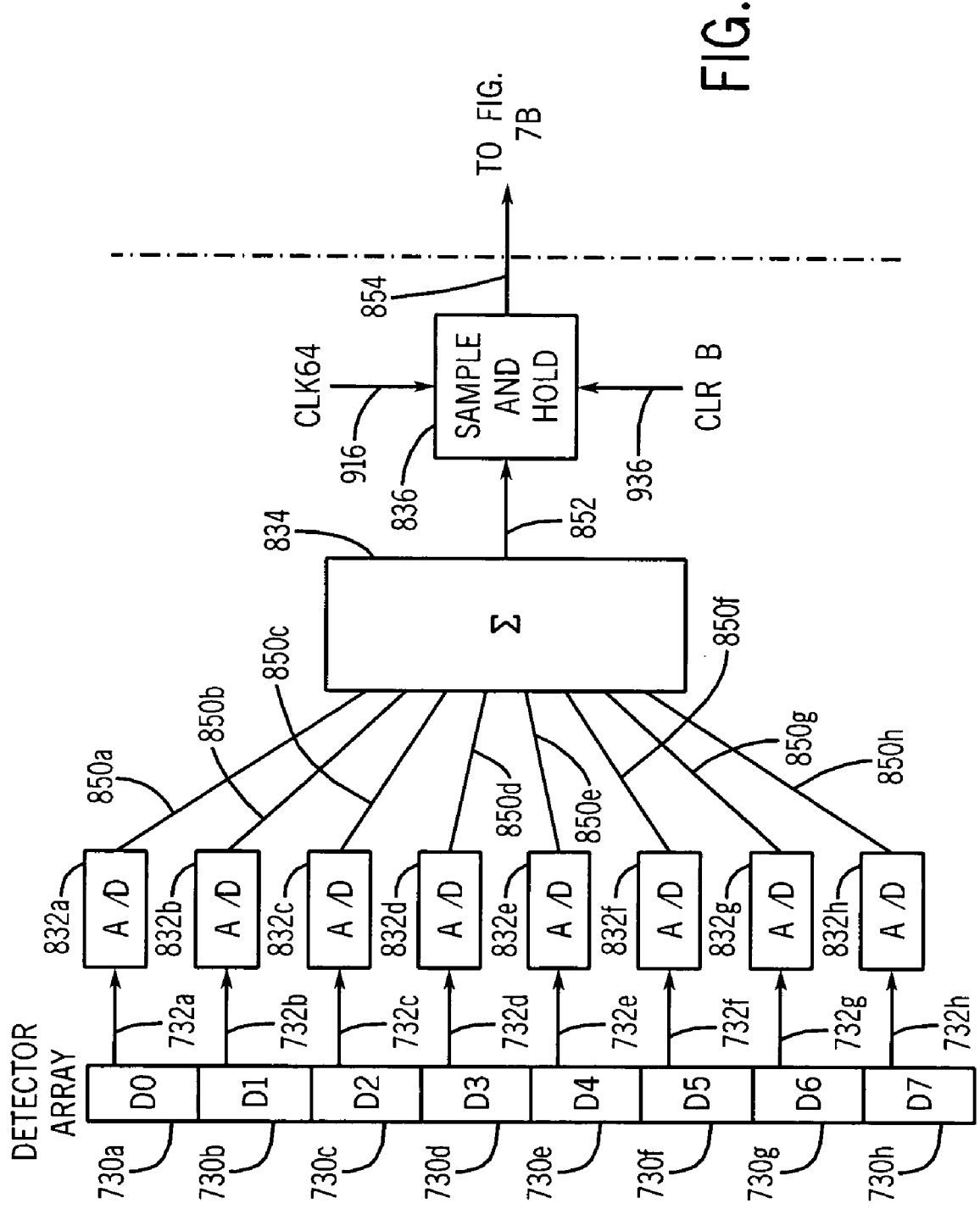
FIG. 7 is a block diagram showing a coding and correction signal generation subpart 830 of an electrical processing part 164 of FIGS. 1, 4, and 5, for use with the piston error control system 140 of laser system 100 of FIG. 1.
Figure 7B:
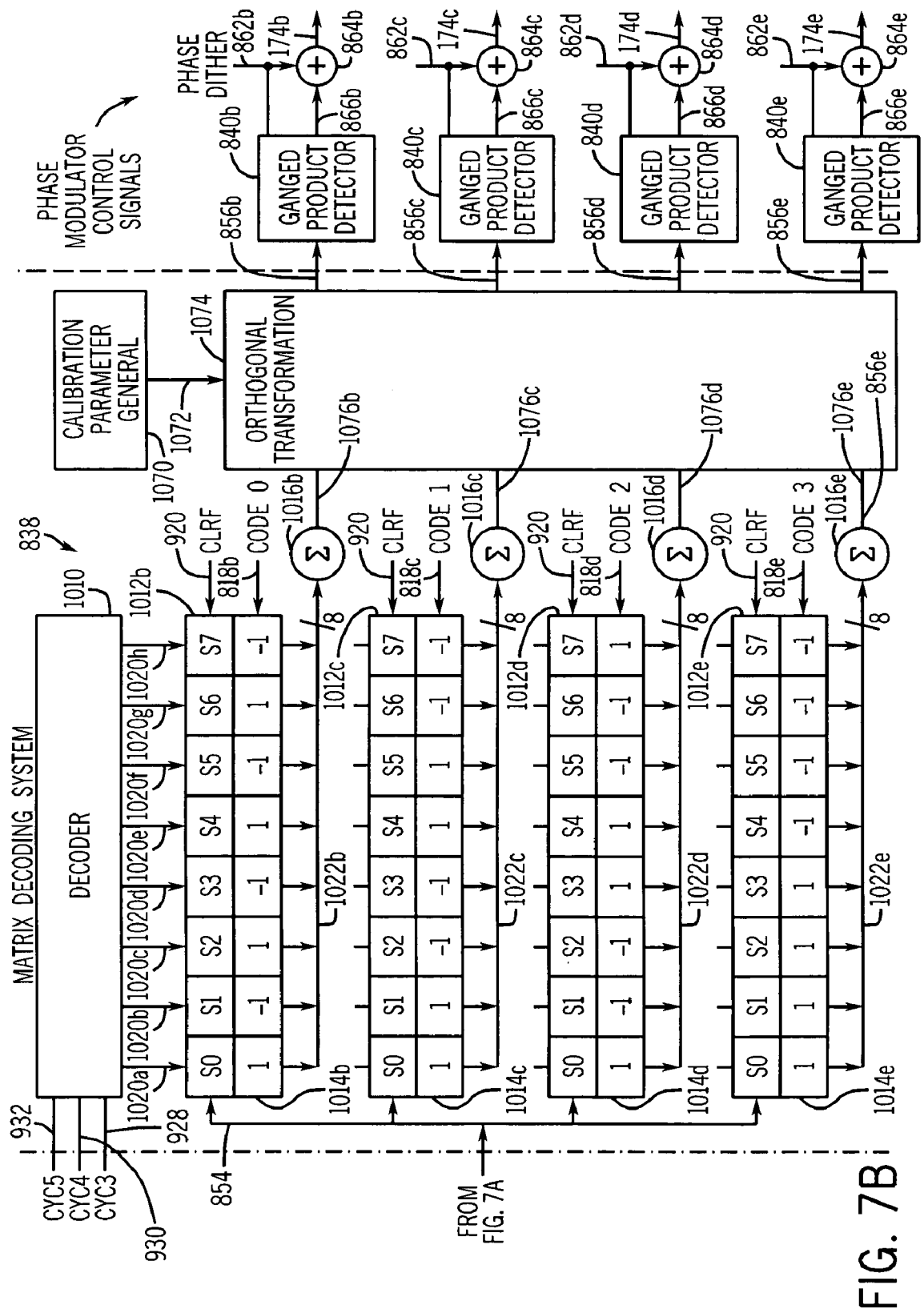

By way of example but not limitation, the detector elements $730a$-$730h$ may be implemented using photocells, photodiodes, phototransistors, photovoltaic devices, CCD or CMOS image sensors, or other appropriate detector devices that can produce an electrical signal representative of the intensity of light incident on the elements. In a laboratory embodiment of a piston error detection and processing unit 140 for use with a 1060 nm laser system, an array of silicon-PIN-diode type detector elements was successfully employed. If a laser system 100 producing output at a wavelength substantially different from this 1060 nm example is to be constructed, it may be necessary to select a different detector type which is more appropriate for the wavelength in use. For example, in the intermediate infrared wavelengths, mercury-cadmium-telluride or indium-antimonide diode arrays could be used. The arrangement of system 100, in which the detector array is operated in a current measurement mode (as opposed to, e.g., a single-photon counting mode), is such that dark current is not considered a major problem, and special cooling of the detector array is not required. As a result, a variety of detector technologies may be suitable. One of skill in the art will appreciate how to select a detector technology appropriate for the wavelength in use. Although eight or nine detector elements are shown in FIGS. 4, 5, and 7, the specific number of detector elements used is non-critical. The number of detector elements used may be selected depending on the commercial availability of suitable detector arrays and on the convenience and expense of a like number of downstream elements, such as analog-to-digital converters, for the processing of the detector output signals. Although the detector 730 is referred to as an "array", any suitable structure could be used, including a monolithic detector device, provided that measurements of secondary beamlet components may be acquired and distinguished from the central lobe. [QUESTION FOR INVENTORS: Is this paragraph correct?]

As best seen in FIG. 4, the detector array 730 may be divided into a first portion, e.g., $730a$-$730d$, and a second portion, e.g., $730e$-$730h$ for measuring the secondary or satellite beamlets as distinct from the central lobe. Optionally, a central detector element $730i$ (shown only in FIG. 4) may be used to measure the power or intensity of the central lobe, in order to assess directly the effectiveness of the control system, as is known in the art. The central lobe output is maximized when the secondary beamlets are suppressed to a maximum extent. Although the detector portion $730a$-$730d$ and detector portion $730e$-$730h$ are depicted as displaced from one another, the drawing is not to scale, the actual separation may be more or less than that shown, and in some applications no separation is necessary. In a commercial embodiment, even if a separation is required, it may be most cost effective to use a single large array, or even a single, monolithic detector. The signal $732i$ from any centrally located detector elements may be ignored, or optionally may be processed separately as a central lobe signal for use in measuring effectiveness of the control system as described above. The detector array 730 furnishes output signals via a detector output signal bus 732, discussed further in greater detail.

In order to correct the piston errors contributed by the individual beamlets, it is necessary to distinguish and measure their individual piston errors and to produce appropriate correction signals. Because each of non-reference beamlets 122b-122e is tagged or encoded with a unique digital signal, an appropriate decoder respectively associated with each non-reference beamlet can be used to distinguish the magnitude and direction of piston error artifact contributed by such beamlet from that contributed by all other beamlets, effectively producing a measure of piston error for each beamlet. These functions are performed by piston error electrical processing part 164.

FIG. 5 is a simplified block diagram of the electrical processing part 136b. The electrical processing part 136b may be subdivided into a clock and code generation subpart 810, which is shown in greater detail in FIG. 6, and a coding and correction signal generation subpart 830, which is shown in greater detail in FIG. 7.

As best seen in FIG. 5, clock and code generation subpart 810 preferably comprises a master clock and cycle timer 812 and a code generator 814.

The master clock and cycle timer 812 provides on bus 816 a set of clock and cycle information signals which are used to control the timing of the remaining elements of electrical processing part 164. Responsive to clock and cycle information from master clock and cycle timer 812, code generator 814 produces code information for use in impressing on each of the non-reference beamlets 122b-122e a respective tagging or identification signal. The tagging or identification signal enables the piston error contributed by each non-reference beamlet in the combined output beam 170 to be distinguished from the other beamlets. Code generator 814 produces control signals containing the code information on a bus 178 which is supplied to the AM modulators 132b-132e. Code generator 814 also provides code information on a bus 818 for use by coding and correction signal generation subpart 830 in detecting the tagging or identification signals. The code generator 814 is described further in greater detail (see FIG. 6 and the description thereof).

In addition to generating beamlet tagging code, the clock and code generation subpart 810 also comprises a phase dither generator 860 which provides a phase dither signal on bus 862. For each of the non-reference beamlets 122b-122e, the phase dither signal 862b-862e is summed with the respective piston error correction estimate 866b-866e to produce a corresponding phase error modulator control signal 174b-174e which is supplied to the corresponding phase modulators 142b-142e. The phase dither signal allows the direction or sign of piston error to be recovered. Only a very small amount of phase dither is needed. For example, the phase dither may be in the range of 30 to 70 mrad. Phase dither in this amount is believed to be sufficient to allow recovery of the sign of the piston error, without significantly degrading the far-field beam quality. The phase dither signal is also supplied to the cascaded product detector units 840b-840e, which are described further in greater detail. All of the phase dither signals must exhibit the same frequency.

As best seen in FIG. 5, coding and correction signal generation subpart 830 comprises a set 832 of analog-to-digital (A/D) converters, a summing junction 834, a sample/hold/accumulate register 836, a matrix decoding system 838, cascaded product detectors 840b-e, and summers 864b-864d. The A/D converters 832 receive output signals 732a-732h from the elements of the detector array 730. Any suitable A/D converters may be used. A/D converters 832 are described herein in plural terms and a separate A/D converter may be provided for each of the detectors in the detector array. Alternatively, a single higher-performance A/D converter could be multiplexed to serve all of the detectors. The data rate for the A/D converters will depend on (a) the number of channels; (b) the desired maximum servoloop bandwidth; (c) the size (i.e., width in bits) of the code words used to distinguishably encode each beamlet; (d) any per-bit oversampling used in acquiring the beamlet error signals; and (e) whether plural, detector-associated A/D converters are used in parallel or a single A/D converter is multiplexed to serve all of the detectors. The bandwidths of the expected piston error disturbances are in the audio range-up to several KHz. Accordingly, the digital frame rate should be a factor of 5 or 10 larger than desired bandwidth. In order to discriminate between the non-reference beamlets using Hadamard code words, the number of non-reference beamlets determines the minimum length of the code words used to encode the beamlets as follows: if the number of non-reference beamlets is a power of two, the minimum length is that same number of elements or bits; if the number of non-reference beamlets is not a power of two, the minimum length in elements or bits is the next larger power of two. However the length of the Hadamard code words need not be limited to this minimum length. For example four beamlets can be encoded by code words with eight elements for better discrimination.

As an example of determining the needed A/D converter bandwidth, assume that the desired servoloop bandwidth is 2 KHz. The resulting frame rate must be at minimum 5 times this number, or 10 KHz. Each code word has 8 code bits. Therefore the code bit rate is 80 KHz. If it is desired to oversample each bit 8 times, then the required A/D bandwidth is the product of this number times 80 KHz or 640 KHz. Current commercially available A/D converters are capable of operation at sampling rates exceeding 1 GSPS. The number of controlled beamlets could increase by a factor of at least 1000 (e.g., to 4000) before currently-available commercial A/D converters would become the limiting factor in the operation of the piston error control system 140. By way of example, but not limitation, a commercially available A/D converter that could be used to implement A/D converters 832 is available from Analog Devices of Norwood, Mass. as type AD 9480; this is an 8-bit A/D converter that can operate at a conversion rate up to 250 MSPS.

The A/D converters 832 provide A/D converter output signals 850a-850g to summer 834, which calculates the total intensity of signal measured by the detectors. The summer effectively averages the detected interfered beam over the dimensions of the detector array. Although the multiple detector elements collect information regarding the spatial variation of the interfered beam produced by optical processing part 136a, it is sufficient for piston detection purposes to measure the total intensity of the interfered beam on the detector (excluding any portion of non-interfered beam). The summer 834 provides an output signal to a sample and hold accumulator 836 on lead 852.

Sample and hold accumulator 836 receives the summed detector output signals from summer 834 and supplies that information at appropriate times to the matrix decoding system 838. Due to detector noise and other factors causing the detected interference beam to vary over time, it is desirable to use a plurality of samples collected at different times for use in measuring piston error. Accordingly, sample and hold accumulator 836 may accumulate a group of samples, such as eight, before releasing the sample information to the matrix decoding system 838, as directed by timing control signals of bus 816 from master clock and cycle timer 812. The accumulating function effectively averages the samples within the group, although it is not necessary that the accumulated sample be normalized by dividing it by the number of samples provided that the number of samples accumulated in each group is consistent. The accumulated sample value is provided to the matrix decoding system 838 via lead 854. This value includes a plurality of time-displaced samples from each of the elements of the detector array (e.g. eight samples from each of the eight detector elements).

Matrix decoding system 838 periodically receives accumulated sample values from sample and hold accumulator 836. Matrix decoding system 838 uses this information to decode therefrom signals representative of the piston error contributed by each of the non-reference beamlets 122b-122e. Each of the decoded piston error contribution signals 856b-856e, along with a corresponding phase dither signal 862b-862e, are furnished to a respective one of cascaded product detector units 840b-840e to produce a corresponding piston error correction estimate 866b-866e. The piston error correction estimate 866b-866e, and the phase dither signals 862b-862d, are supplied to respective summers 864b-864e, to produce corresponding phase modulator control signals, which are furnished to phase modulators 142b-142e via bus 174. The function of the cascaded product detector units 840b-840e is described further in greater detail (see FIG. 8).

Although A/D converters 832, summer 834, sample and hold accumulator 836, matrix decoding system 838, cascaded product detector units 840, and summers 864 are depicted as separate devices, any one or more of them could be implemented as part of a computer-based control system, and any one or more of them could be integrated in various combinations, as is known in the art.

Figure 6:
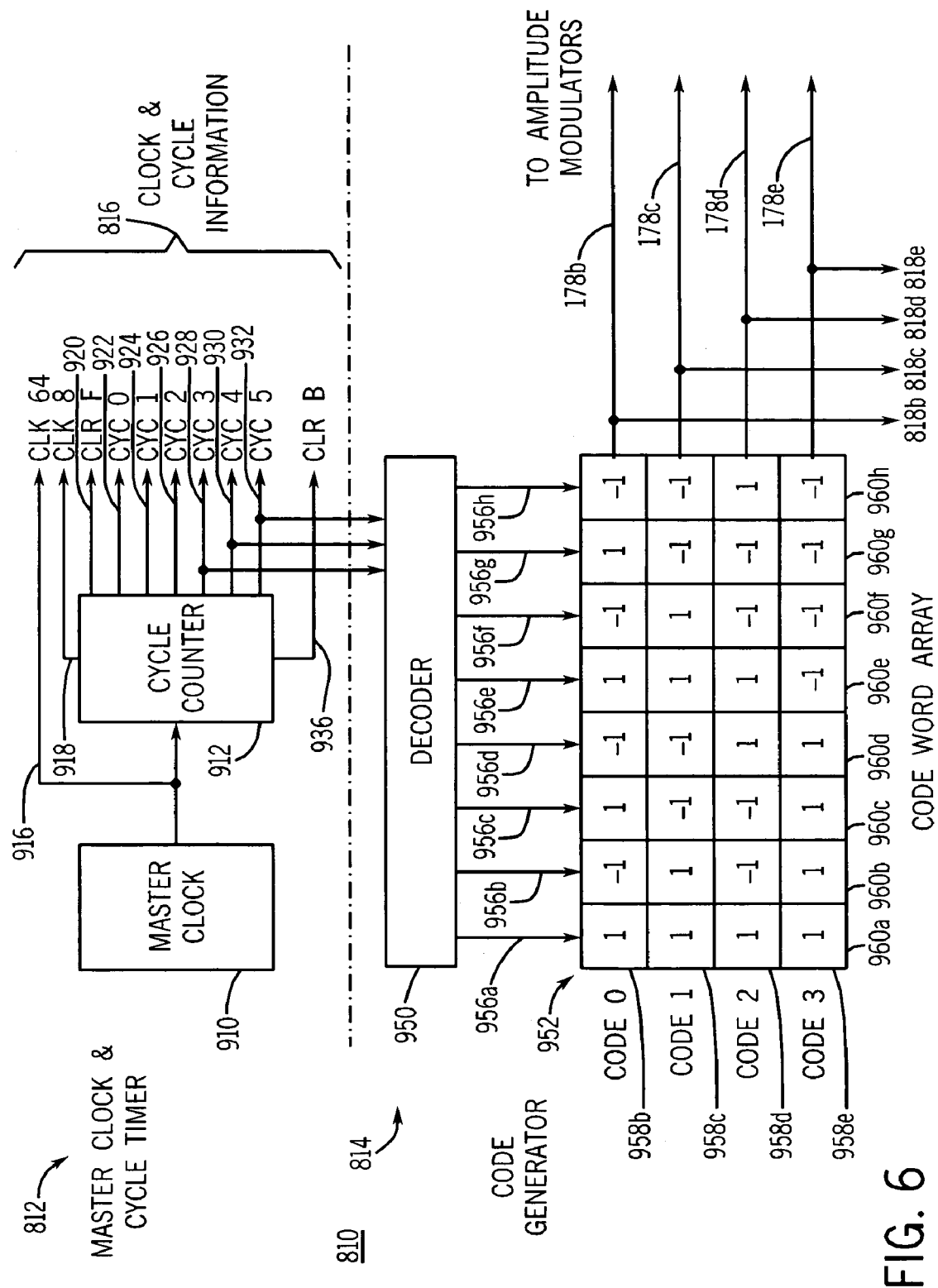
FIG. 6 is a block diagram depicting in greater detail a clock and code generation subpart 810 of the electrical processing part 164 of piston error detection and processing unit 144 of FIGS. 1, 4 and 5, for use with the piston error control system 140 of laser system 100 of the present invention.

FIG. 6 depicts elements of the clock and code generation subpart 810 in greater detail. The master clock and cycle timer 812 preferably comprises a master clock signal generator 910 and a cycle counter 912. The master clock signal generator 910 is a clock oscillator that defines the timing of the rest of electrical processing part 136b. As discussed further in greater detail, individual 8-bit repeating code words are used to modulate each of the non-reference beamlets 122b-122e. Each bit or element of the code is sequentially selected and transmitted (i.e., used for modulation of the non-reference beamlets) for 8 sample periods, to allow a plurality of samples to be collected and accumulated to minimize sampling noise and other unintentional variation over time. Accordingly, the master clock signal generator 910 produces a minor clock signal CLK64 on lead 916, each cycle of which defines a sampling period. Eight sample periods define the length of a bit of the code. 64 sampling periods and 64 cycles of the CLK64 signal, starting with the first bit and ending with the eight bit, define a "frame" or the period required to transmit a complete code word.

The cycle counter 912 receives the minor clock signal CLK64 916 and produces a number of derivative signals. A six-bit counter within cycle counter 912 produces a six-bit binary value representing a cycle number within a frame. The cycle number is presented as six cycle-count bit signals, starting with least-significant bit CYC0 922, and increasing in significance through CYC1 924, CYC2 926, CYC3 928, and CYC4 930, to the most-significant bit CYC5 932. The three most-significant bits CYC3 928, CYC4 930, and CYC5 932 identify the current code word bit number. A CLK8 signal 918 is asserted every eight minor cycles and identifies when the accumulated samples for the current code-word bit should be shifted into the matrix decoding system 838. A CLRB signal 936 is also asserted every eight minor cycles and identifies when the sample corresponding to the current code-word bit should be cleared from DSSC sample and hold accumulator 474. A CLRF signal 920 is asserted every 64 minor cycles, at the beginning of each frame, and identifies when each sample word should be cleared from registers in the matrix decoding system 838. Signals CLK64 916, CLK8 918, CLRF 920, CYC0 922, CYC1 924, CYC2 926, CYC3 928, CYC4 930, CYC5 932, and CLRB 936 form the clock and cycle information bus 816.

Code generator 814 generates an appropriate code which may be used to modulate each of the non-reference beamlets 122b-122e such that the piston error contribution from each beamlet may be measured in a way that distinguishes that contribution from those of all other beamlets. The tagging or identification signal may, for example, be produced by associating with each beamlet one or more unique code words or vectors from a Hadamard dictionary, replacing code vector elements of value 0 with the value −1, and selecting in turn individual elements of such code vector to control the modulator on a periodic basis. Hadamard codes are easy to generate in groups with a number of members that is a power of 2. Because the reference beam is not tagged or identified, the number of beamlets must be odd.

Normally, Hadamard code sequences employ ones and zeros. As is known in the art, a Hadamard code vector is orthogonal to all other non-identical Hadamard code vectors, in the sense that when two non-identical Hadamard code vectors are compared, the sums of bits that are the same, minus the sum of bits that are different, normalized by the number of bits, is zero. The Hadamard code words can be modified to replace code word elements of value 0 with the value −1. For example, the following four code words: Code0=(1, −1, 1, −1, 1, −1, 1, −1); Code1=(1, 1, −1, −1, 1, 1, −1, −1); Code2=(1, −1, −1, 1, 1, −1, −1, 1); and Code3=(1, 1, 1, 1, −1, −1, −1, −1) could be used to encode non-reference beamlets 122b-122e respectively. By modifying the Hadamard code words to replace code vector elements of value 0 with the value −1, and normalizing the vector to unit length, the sum of the elements in a Hadamard code vector is zero, and any two such vectors are orthonormal. These properties allow a signal encoded with a Hadamard code vector to be distinguishably decoded in the presence of other such signals.

Code generator 814 comprises a decoder 950 and a code word array 952. The decoder 950 is a 3-line to 8-line decoder which receives the three most-significant cycle-count bits CYC3 928, CYC4 930, CYC5 932 and asserts one of eight decoded bit-select signals 956a-956h corresponding to the current code word bit number identified thereby. The code word array 952 stores a copy of each of the 8-bit code words Code0 through Code3 in rows 958b through 958e of the array, respectively, corresponding to non-reference beamlets 122b-122e. Each of columns 960a-960h corresponds to one of the code word bits enabled by the bit-select signals 956a-956h.

For each of the code words 958b-958e in the array, the array provides a corresponding output signal 818b-818e which contains the value of the selected bit of such code word. For example, code word 0 output signal 818b contains the value of the bit of Code0 which is currently selected by decoder 950. As the cycle counter 912 advances through bit numbers 0-7, each bit of Code0 is output in turn on code word 0 output signal 818b. The array behaves similarly with respect to code words Code1-Code3 958c-958e, supplying output signals 818c-818e. The output signals from code generator 814 and code word array 952 thereof are also supplied to the AM modulators 132b-132e as AM modulator control signals 178b-178e respectively.

The phase dither generator 860 (shown only in FIG. 5) produces in conjunction with summing junctions 864b, 864c, 864d, and 864e, a unique phase dither signal for each of the non-reference beamlets 122b-122e. These signals are at a common frequency, supplied by the phase dither generator, 860, but each has a unique phase shift applied through the summing junction that just compensates the phase error in the respective controlled beamlet. The phase dither generator may create either a sine or a square wave—either will work—but must have low phase noise or 'jitter'. Specifically the RMS phase jitter is preferably less than 1%. If $d\phi/dt$ is the random generator phase excursion per unit time, then it is preferable that $(1/\omega)|d\phi/dt|<0.01$. Additionally, it should have a frequency in the range of 8 to 12 times the system sampling frequency. Circuits and algorithms for producing a phase dither signal are known in the art.

FIG. 7 is a block diagram depicting coding and correction signal generation subpart 830, and in particular, matrix decoding system 838, in greater detail. As described earlier in connection with FIGS. 4 and 5, detector elements 730a-730h provide detector output signals 732a-732h to A/D converters 832a-832h. The A/D converters 832a-832h provide A/D converter output signals 850a-850h to summer 834. Summer 834 determines the sum of the A/D converter output signals detector array, effectively averaging the detected interfered beam over the dimensions of the detector array. The output of summer 834 is furnished to sample and hold accumulator 836 via path 852. The sample and hold accumulator 836 receives clock signal CLK64 916, and accepts and accumulates a sample summer 834 once each minor cycle (eight times per code word bit period). The accumulator output signal 854 containing the accumulated sample value is furnished to matrix decoding system 838. The sample and hold accumulator 836 receives a bit clear signal CLR-B 936, which is active briefly at the end of each code word bit period, and which instructs the accumulator to clear its contents to enable it to accumulate samples corresponding to the next code word bit.

The matrix decoding system 838 comprises a decoder 1010, a group of four piston error decode matrices, each assigned to decode the piston error contributions from one of the non-reference beamlets 122b-122e, and a transformation unit 1074 and calibration parameter generator 1070 used to correct certain crosstalk errors. The decoder 1010 is a 3-line to 8-line decoder which receives the three most-significant cycle-count bits CYC3 928, CYC4 930, CYC5 932 and asserts one of eight decoded bit-select signals 1020a-1020h corresponding to the current code word bit number identified thereby.

Each of the piston error decode matrices comprises a sample register denoted 1012b-1012e, respectively, a code word register/multiplier denoted 1014b-1014e, respectively and a summer denoted 1016b-1016e.

Each of the sample registers 1012b-1012e is eight positions wide. Each of these eight positions is capable of receiving and storing the accumulated detector sample value corresponding to one code-word bit period as furnished by DSSC sample and hold accumulator 474. The bit select signals 1020a-1020e from decoder 1010 are provided to each of the sample registers 1012b-1012e. As the cycle counter advances through each code word bit and an accumulated sample value for that bit becomes available from DSSC sample and hold accumulator 474, the decoder 1010 asserts the corresponding one of the bit-select signals 1020a-1020h, and that value is stored in the corresponding bit position of sample registers 1012b-1012e.

Although each bit position corresponds to a code-word bit period, the value stored therein is not a binary value. Instead, this value represents all of the samples collected from the several detector elements during the sampling intervals occurring in one bit period. Thus, in the embodiment described herein, the value would represent eight detector elements, sampled eight times per bit period, for a total of 64 samples. The value may be stored in the form of an integer, a fixed point number, or a floating point number, or an analog (continuous-valued) quantity, depending on the particular types of detectors, post-detector signal processing, and the storage provided in the sample registers 1012b-1012e.

Each of the code word registers/multipliers 1014b-1014e is also 8 positions wide. Each of these eight positions is capable of receiving and storing one code word bit value provided by the code word array 814 (FIGS. 8-9) via code word output signals 818b-818e. The bit select signals 1020a-1020e from decoder 1010 are provided to each of the codeword registers 1014b-1014e. As the cycle counter advances through each code word bit interval, and a set of code word bits becomes available from the code generator 814, the decoder 1010 asserts the corresponding one of the bit-select signals 1020a-1020h, and that value is stored in the corresponding bit position of codeword registers/multipliers 1014b-1014e. Each value may be a 1 or a −1. Thus, once the eighth codeword bit becomes available, each of the codeword registers/multipliers 1014b-1014e contains a corresponding complete codeword identical to that stored in code word array 952 and used to modulate a corresponding one of the non-reference beamlets 122b-122e. Although the code word bits are described herein as being individually received from code generator 814 and "clocked" into each of the codeword registers/multipliers 1014b-1014e, other implementations could be used. For example, each of the codeword registers/multipliers 1014b-1014e could contain a permanent copy of the corresponding code word row 958b-958e of code word array 952.

Once a complete set of samples has been stored in all of the positions of the sample registers 1012b-1012e, and a complete codeword has been stored in codeword registers/multipliers 1014b-1014e, the codeword registers/multipliers 1014b-1014e perform a bit-position-wise multiplication of the sample values in the sample registers 1012b-1012e by the corresponding codeword values in the codeword registers/multipliers 1014b-1014e, and supply the results to the corresponding summers 1016b-1016e.

Figure 10:
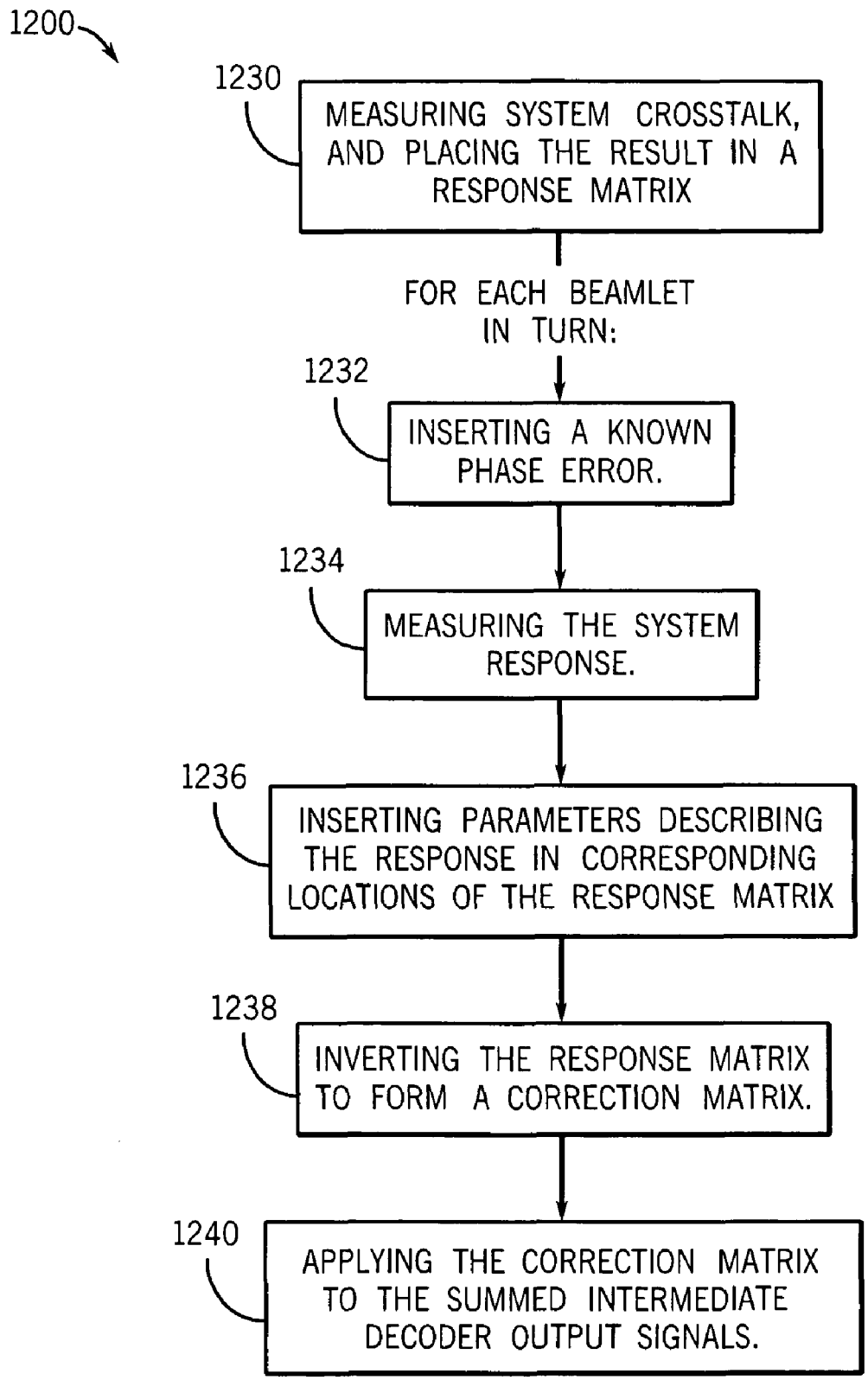
FIG. 10 is a flow diagram showing a method 1200 for use in conjunction with the laser system 100 of FIGS. 1 and 4-8 for minimizing crosstalk and other error arising from the use of square-law, non-spatially differentiated detection.

Consider, for example, the uppermost of the piston error decode matrices shown in FIG. 10, assigned to decode the piston error contributed by intermediate beamlet 122b, and including sample register 1012b, codeword register/multiplier 1014b, and summer 1016b. For each of the eight sample or code word bit positions in sample register 1012 and codeword register/multiplier 1014b, the codeword register/multiplier 1014b multiplies the corresponding accumulated sample value by the corresponding code word bit value, and furnishes this product to summer 1016b on a multiplier output signal bus 1022bb. Thus, the codeword register/multiplier 1014b performs eight multiplications, and the summer 1016b receives therefrom eight multiplication products. The summer 1016b determines the sum of the products and produces an intermediate decoded phase error contribution signal 1076b. This signal 1076b is termed "intermediate" in that a crosstalk correction may subsequently be applied to the signal by a transformation unit 1074 (described further in greater detail) before further processing outside of the matrix decoding system 838.

The codeword register/multiplier 1014b and the summer 1016b effectively calculate the inner (dot) product of the bitwise-collected samples of the combined output beam piston error and the bits of code word 958b used to modulate beamlet 122b. As noted earlier, a property of Hadamard code words is orthogonality: the inner product of any two non-identical Hadamard code words is zero. Thus, the calculated inner product furnished by summer 1016*b* represents nearly exclusively the piston error contributed by beamlet 122*b*. Because each of the other non-reference beamlets 122*c*-122*e* is modulated using a different Hadamard code word, the inner products of code word 958*b* and the piston error contributions of the other beamlets, which are modulated by such other code words, is nearly zero. Thus, decode matrix selects the piston error contribution of beamlet 122*b*, and rejects the piston error contributions of the other beamlets 122*c*-122*e*.

After the sum of products has been furnished to the transformation unit 1074, and responsive to the CLRF signal 920, sample register 1012*b* is cleared so that it may accept samples for the next frame. The codeword register/multiplier 1014*b* may be cleared at the same time.

A similar process occurs in each of the other piston error decode matrices, respectively employing sample registers 1012*c*-1012*e*, codeword registers/multipliers 1014*c*-1014*e*, and summers 1016*c*-1016*e*, producing intermediate decoded phase error contribution signals 1076*c*-1076*e*.

The use of orthogonal Hadamard code words allows an arbitrary number of beamlet errors to be processed at the same time with an acceptable or correctable amount of crosstalk. Although the orthogonality of the Hadamard code words suggests that the piston error components contributed by the other beamlets might be completely rejected, in practice, there will likely be some crosstalk as a result of a number of factors, including the detection arrangement, which employs square-law detectors and measures total energy in each sideband (as opposed to interferometry or other technical solutions), detector noise, conversion error, arithmetic precision error, and the time-varying nature of the piston error components. However, it is believed that such crosstalk will be quite small, and even in the presence of crosstalk, the servo loops will still drive piston error to zero, but at a slower rate. It was found by analysis and numerical modeling of an embodiment that there is a fixed, small crosstalk error that is correctable by performing linear transformation on the Hadamard outputs. Other approaches to minimize the effect of crosstalk could also be used. For example, an alternative solution is to modulate each beamlet in sequence, alone rather than simultaneously, so that encoded/modulated samples from only one beamlet are presented to the decoder at a time. However, this alternative would result in a reduction in the servo loop bandwidth.

In order to correct the crosstalk error, all of the intermediate decoded phase error contribution signals 1076*b*-1076*e* are supplied to a transformation unit 1074, which applies a crosstalk correction to the signals 1076*b*-1076*e* and produces corresponding final decoded phase error contribution signals 856*b*-856*e*. By way of example, but not limitation, the transformation unit 1074 applies an orthogonal, linear transformation on the intermediate signals 1076*b*-1076*e* by effectively performing a matrix multiplication of these signals by a correction matrix supplied by a calibration parameter generator 1070 over a signal path 1072. The correction matrix parameters may be developed or calibrated by applying a small known phase error, in turn, to each non-reference beamlet 122*b*-122*e*, observing the results, and storing them in a result matrix. The result matrix is then inverted and normalized, such that its determinant is 1, to produce the correction matrix. An example method for performing this calibration is described further in connection with FIG. 10.

Figure 8:
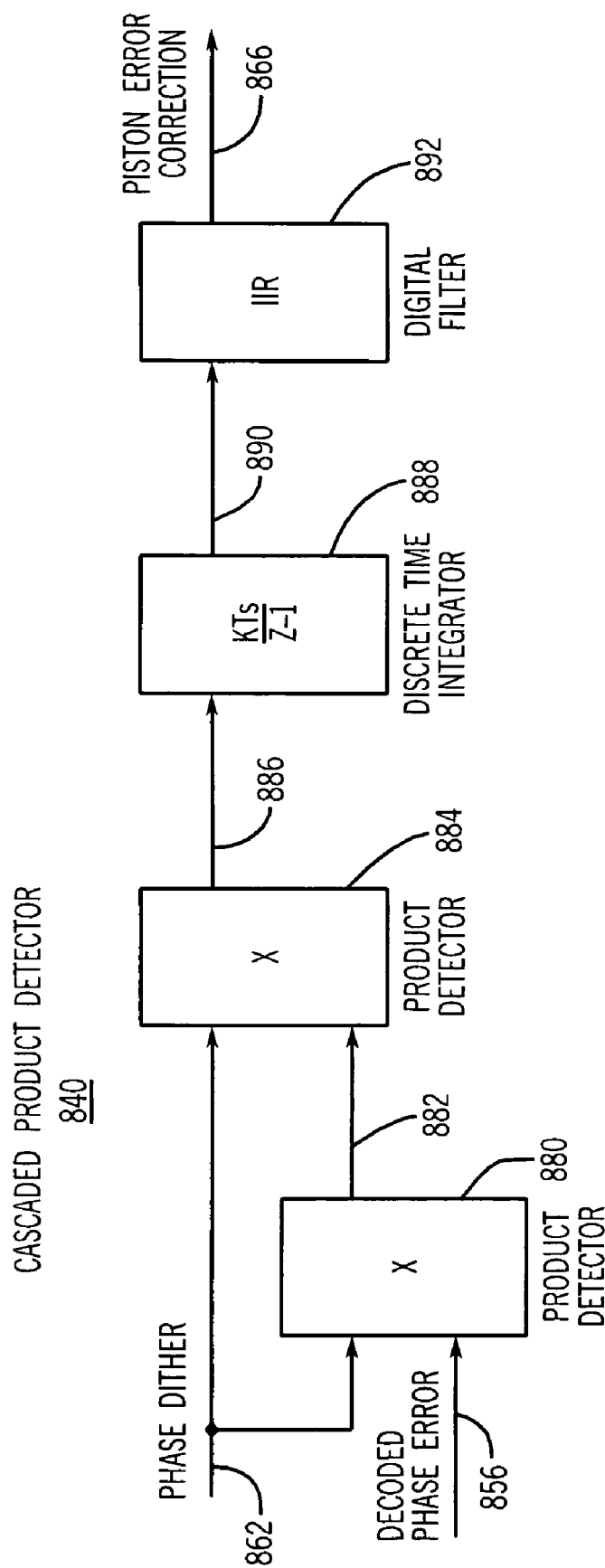
FIG. 8 is a block diagram showing an example cascaded product detector circuit for use with the coding and correction signal generation subpart 830 of FIG. 7.

For each of the non-reference beamlets 122*b*-122*e* the respective decoded piston error contribution signal 856*b*-856*e* produced by the transformation unit 1074 is furnished to a corresponding one of the cascaded product detector units 840*b*-840*e*. Each of the decoded piston error contribution signals 856*b*-856*e* is an oscillating signal, which represents piston error in the corresponding beamlet 122*b*-122*e* by the phase of such signal as compared to the phase dither signal 862*b*-862*e*. FIG. 8 is a block diagram of an example cascaded product detector unit 840. As best seen in FIG. 8, the cascaded product detector 840 receives the phase dither signal 862 from phase dither generator 860 and the decoded phase error contribution signal 856. The phase dither signal 862 is provided to first and second product detectors 880 and 884. The decoded phase error contribution signal 856 is provided to the first product detector 880, and the resulting output signal 882 is provided to the second product detector 884. Thus, the first and second product detectors are cascaded. The output signal 886 is provided to a discrete time integrator 888. Any suitable integrator could be used, and the integrator may have a gain, e.g., in the range of 1500-2500. The output signal from the integrator is furnished to a low-pass filter 892. Any suitable low-pass filter with good skirt rejection could be used to implement filter 892. For example but without limitation, filter 892 may be a digital infinite impulse response (IIR), low-pass, 8-pole elliptical filter with a cut-off frequency around 0.1 times the Nyquist frequency of the sampling system. Other filter designs which offer good skirt rejection may also be used; it is believed that cut-off frequencies up to around 0.2 s time the Nyquist frequency of the sampling system could be useable. The odd-ganged product detector advantageously allows the piston error detection and processing unit 144 to detect the sign of the phase error, despite the use of square-law optical detector in detector array 730. The output of digital filter 892 is an estimated piston error correction signal 866, corresponding to a particular beamlet. The output of each of the cascaded product detector units 840*b*-840*e* is supplied to a corresponding summer 864*b*-864*e* where a small amount of phase dither from phase dither signal 862*b*-864*e* is added. The output of summer 864*b*-864*e* is a phase error modulator control signal provided to phase modulators 142*b*-142*e* via bus 174. The phase modulators provide a phase delay rate proportional to the magnitude of the control signals, and consistent with the sign thereof, forming a "Type I" servo loop. The update rate of the servo loop is the frame rate determined by the clock generator. One frame is equivalent to eight code word bits, which, in turn, is equivalent to 64 minor cycles. The servo loop bandwidth is typically 0.1 times the reciprocal of the frame rate.

Although the processing of piston error contributed by four non-reference beamlets is described herein, a larger number of beamlets than four could be accommodated in a straightforward manner. It would be necessary to lengthen the code words so that additional orthogonal code words could be generated. The width of code word array 952, sample registers 1012*b*-1012*e*, and codeword registers/multipliers 1014*b*-1014*e* would also be enlarged to accommodate the longer code words. In addition, the depth of code word array 952, and the number of piston error decode matrices, would be enlarged to accommodate the additional number of code words to be decoded.

The use of amplitude modulation for beam tagging results in a smaller adverse impact on far-field beam quality than other possible beam tagging methods. Although a small phase dither is also introduced, the amount of dither is sufficiently small that the resulting degradation of the far-field beam quality is negligible.

Figure 9:
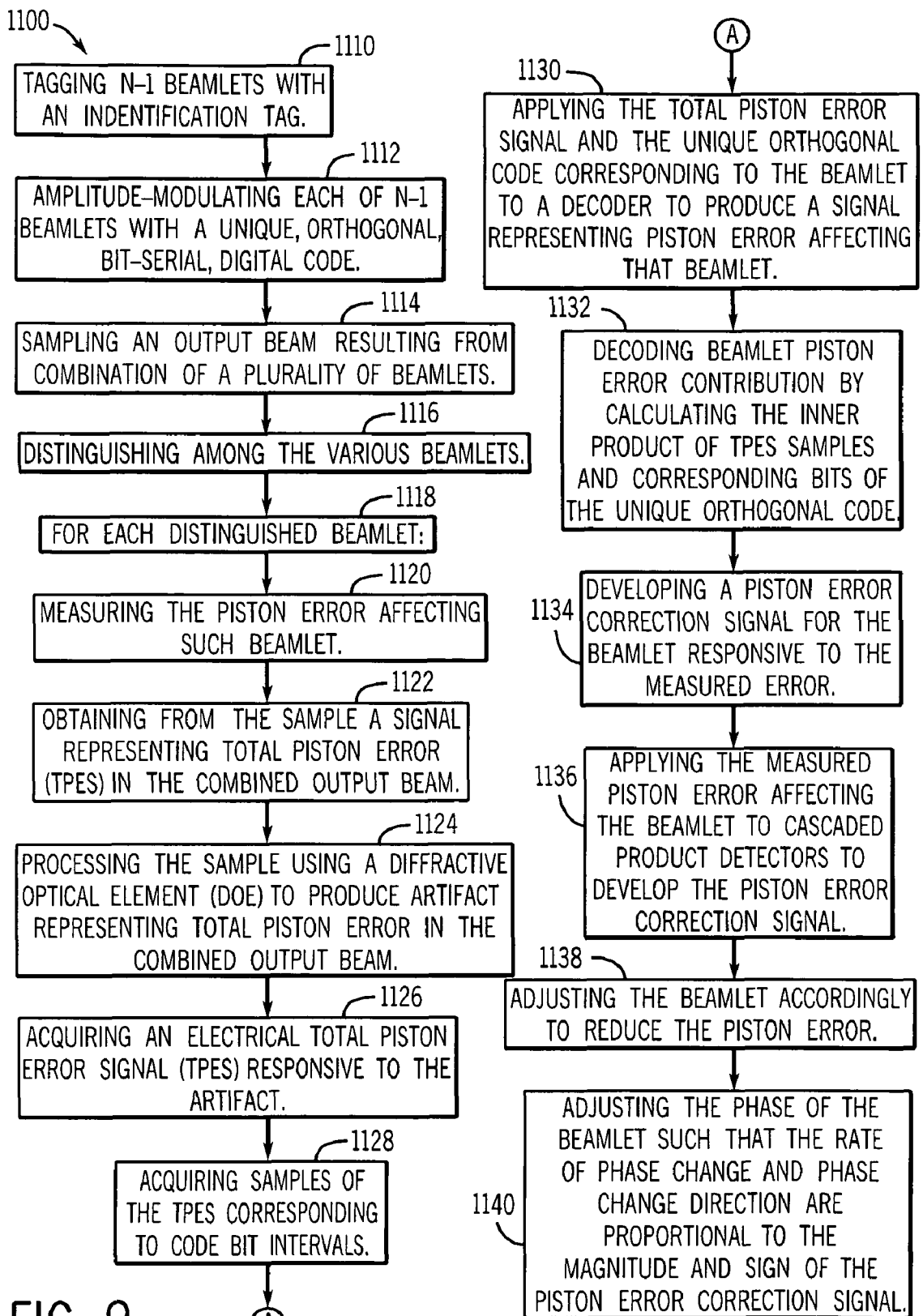
FIG. 9 is a flow diagram showing a method 1100 for use in conjunction with the laser system 100 of FIGS. 1 and 4-8 in controlling piston error.

In accord with a further aspect of the present invention, FIG. 9 is a flow diagram of a method 1100 for use with the laser system 100 for use in controlling piston error. One of skill in the art will appreciate that the method may be used with the apparatus of FIGS. 1 and 4-8, but could also be used with other apparatus and with other beamlet tagging techniques without departing from the spirit of the invention. Accordingly, some primary steps are presented in a generalized form that does not rely on the particular apparatus of FIGS. 1 and 4-8. It is noted in the description of certain steps and substeps that such steps may be performed by specific elements of the apparatus of FIGS. 1 and 4-8. The association of steps and apparatus is done by way of example but not limitation, and it is to be understood that these steps could be performed by other apparatus. Moreover, optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

In step 1110, the system tags each of at least N−1 beamlets with an identification tag code, or signal or the like, where N is the total number of beamlets. Because the central beamlet is assigned as a reference beamlet, then that beamlet may be defined to have zero correctable piston error, and need not be tagged.

In an optional substep 1112, the tagging of step 1110 is implemented by amplitude-modulating each of the N−1 beamlets with a unique, orthogonal, bit-serial, digital code, such as a Hadamard code. Other codes and beamlet tagging or identification techniques could also be used. Steps 1110 and 1112 may be performed, for example, by clock and code generation subpart 810 of electrical processing part 164 and by AM modulators 132 of FIGS. 1 and 5-7.

In step 1114, a continuous, low-intensity sample of the combined output beam emitted from the collimating array 150 is obtained. Step 1114 may be performed, for example, by piston error sampling beam splitter 146 of FIG. 1.

In step 1116, the system distinguishes among the various beamlets. In step 1118, beamlets are selected or isolated for further processing. Subsequent steps are performed with respect to each sampled beamlet, and may be performed for all beamlets in parallel, or may be performed for each beamlet in seriatim.

In step 1120, the system measures the piston error contributed by a particular beamlet, distinguishing the piston error contributed by the corresponding beamlet from that of other beamlets using the identification tag of step 1110. The term "measure" as used in connection with steps 1120, 1122, 1124, 1126, 1128, and 1130 is not intended to refer to a precise numerical value having significance outside of the piston error control system 130. Instead, the term "measure" as used here refers to developing a signal representative of the error, and containing sufficient information for the piston error control system 130 to effectively adjust or correct the piston error. Although the measuring step, as implemented by the apparatus of FIGS. 1, and 7-10, produces a signal proportional to and having the sign of the error, other implementations could use other types of signals, including non-proportional or discrete-valued signals. Although such other types of signals may not provide the performance of a proportional signal, the control achieved by such other types of signals may nonetheless minimize the piston error sufficiently for some applications. The functions of step 1120 may be performed, for example, by piston error detection and processing unit 144.

In an optional substep 1122, the measuring of step 1120 is partially implemented by obtaining from the sample a signal representing total piston error (TPES) in the combined output beam. The functions of step 1122 may be performed, for example, by optical processing part 162 of piston error detection and processing unit 144.

In an optional substep 1124, the obtaining of step 1122 is partially implemented by processing the sample using a diffractive optical element (DOE). The output of the DOE includes artifacts, which may be secondary or "satellite" beamlets, which represent the total piston error in the combined output beam. The functions of step 1124 may be performed, for example, by wedge array 182 and DOE 186 of the optical processing part 162 of piston error detection and processing unit 144.

In a further optional step 1126, the obtaining of step 1122 is further partially implemented by acquiring an electrical total piston error signal (TPES) responsive to the artifact produced in step 1124. The functions of step 1124 may be performed, for example, by the photodetector 730.

In a further optional step 1128, the obtaining of step 1122 is further partially implemented by acquiring samples of the total piston error signal at intervals corresponding to those during each bit of the tagging or identification code is used to modulate the beamlets. The functions of step 1124 may be performed, for example, by A/D converters 832, summer 834, and sample and hold accumulator 836, of FIGS. 4, 5, and 7.

In an optional substep 1130, the measuring of step 1120 is further partially implemented by applying the total piston error signal and the unique orthogonal code corresponding to the distinguished beamlet to a decoder to produce a signal representing piston error affecting or contributed by that beamlet. The functions of step 1130 may be performed, for example, by matrix decoding system 838 of FIGS. 5 and 7.

In an optional substep 1132, the process of producing a signal representing piston error contributed by a beamlet of step 1130 is partially implemented by decoding the tagging or identification signal which have been used to modulate the beamlet and which now encodes the piston error contribution of the beamlet within the total piston error signal. This is performed by calculating the inner product of the bits of the unique orthogonal code used to modulate the beamlet during one code word frame, with the total piston error signal samples acquired at the time those bits were used. The functions of step 1132 may be performed, for example, by sample registers 1012b-1012e, codeword registers/multipliers 1014b-1014e, and summers 1016b-1016e of FIG. 7.

In step 1134, the system develops a piston error correction signal for the beamlet responsive to the measured error. In an optional substep 1136, the error correction signal development of step 1134 may be implemented by applying the measured piston error affecting the beamlet to a cascaded product detector unit to develop the piston error correction signal. The function of step 1136 may be performed, for example, by cascaded product detectors 840b-840e of FIGS. 5 and 7.

In step 1138, the system adjusts the beamlet in accord with the piston error correction signal of step 1134 to reduce the piston error contributed by that beamlet. In an optional substep 1140, the adjusting of step 1138 may be implemented by adjusting phase of the beamlet such that the rate of change and change direction is proportional to the magnitude and sign of the piston error correction signal. The functions of steps 1138 and 1140 may be performed, for example, by phase modulators 142b-142e which can introduce a phase delay in non-reference beamlets 122b-122e and thereby adjust the phase of the beamlet with respect to the reference beamlet 122a.

The steps or operations described herein are just for example. There may be many variations to these steps or operations without departing from the spirit of the invention. For instance, the steps may be performed in a differing order, or steps may be added, deleted, or modified.

In accord with a further aspect of the present invention, FIG. 10 is a flow diagram of a method 1200 for use with the laser system 100 for use in calibrating and using a transformation unit 1074 of the matrix decoding system 838. One of skill in the art will appreciate that the method may be used with the apparatus of FIGS. 1 and 4-8, but could also be used with other apparatus and with other beamlet tagging techniques without departing from the spirit of the invention. Accordingly, some primary steps are presented in a generalized from that does not rely on the particular apparatus of FIGS. 1 and 4-8. It is noted in the description of certain steps and substeps that such steps may be performed by specific elements of the apparatus of FIGS. 1 and 4-8. The association of steps and apparatus is done by way of example but not limitation, and it is to be understood that these steps could be performed by other apparatus. Moreover, optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

Steps 1230-1240 are directed to the calibration and use of facilities for transforming the output signals from the decoder matrices to minimize crosstalk, and may by way of example but not limitation, be performed in or by calibration parameter generator 1070 and transformation unit 1074. (See FIG. 7). These steps may further be considered optional, in that the crosstalk these steps would correct could, in some embodiments be tolerable even without correction, or could be minimized by selecting, one-at-a-time, each non-reference beamlet, and tagging and decoding the piston error contribution of each beamlet independently of all other beamlets.

In step 1230, system crosstalk is measured and placed in a response matrix. In optional substeps 1232, 1234, and 1236, the measuring and placing of step 1230 may be performed, for each non-reference beamlet in turn, as follows: In substep 1232, a known phase error (e.g., a delay) is inserted into a subject beamlet. In substep 1234, the system response to the known phase error in the subject beamlet is measured. In substep 1236, parameters describing the measured system response are inserted in corresponding locations of a response matrix. The execution of substeps 1232-1236 with respect to each of the non-reference beamlets produces a response matrix that describes the response of the system with respect to the known phase error in all of the non-reference beamlets.

In step 1238, the response matrix is inverted to form a correction matrix. The correction matrix may be further normalized so that its determinant is 1. In step 1240, the correction matrix is applied to the intermediate decoder output signals produced by the decoder matrices 1012b-1012e of matrix decoding system 838. This may be accomplished by performing a matrix multiplication of a column vector representing the intermediate decoder output signals by the correction matrix, e.g., in transformation unit 1074. Apparatus organized in another manner could perform an analogous or equivalent operation. This step produces crosstalk-corrected output signals 856b-856e, which are supplied by the matrix decoding system 838 to the ganged product detectors 840b-840e.

Thus, there has been described an improved high-power laser system which includes a laser master oscillator, a plurality of fiber laser amplifiers producing intermediate output beamlets, a beam combiner for combining the intermediate beamlets into a combined output beam, and one or more error controllers for minimizing errors related to beam combination that may degrade the quality of the combined output beam.

A piston error controller provides for each intermediate beamlet a unique tagging signal with which the beamlet is amplitude-modulated prior to combining. The tagging signal allows the contribution of each beamlet to piston error artifact in the combined output signal to be distinguished from that of other beamlets. The piston error controller obtains a sample of the combined output beam, and processes the sample through a diffractive optical element (DOE). A diffractive optical element (DOE) is a special type of coarse grating having a specifically designed grating profile or shape, which is capable of combining the plurality of intermediate beamlets into a single combined output beam. The sample beam comprises several constituent beamlets. When piston error is present among the constituent beamlets, it causes the emission from the DOE of secondary, "satellite", or artifact beamlets in directions corresponding to diffractive orders of the DOE other than the central lobe. This allows an optical signal representative of total piston error to be isolated from a sample of the combined output beam.

The optical piston error signal is captured by a detector, decoded to distinguish among contributions from the various beamlets, and for each non-reference beamlet, generates an error control signal proportional to the measured the piston error. Each error control signal is used to control a corresponding phase modulator. The tagging signal may be produced by associating with each beamlet one or more unique code words or vectors from a Hadamard dictionary. A unique dithering signal is also provided to phase modulate the beamlet before combination. The phase dithering is done at a very low level to avoid degrading the output beam's far-field pattern. The phase dithering allows recovery of the sign or direction of the phase error.

The piston error control system advantageously minimizes the production of secondary beamlets exiting the DOE beam combiner, thereby maximizing the energy in the primary combined output beam and improving beam quality. The piston error control system is relatively resistant to crosstalk among beamlets, but due to the nature of the controllers as first-order servo-loops, the error will eventually converge to zero despite the crosstalk, albeit perhaps at a slower rate.

Although this invention has been described as it could be applied to a laser system employing fiber laser amplifiers with intermediate beamlets combined by a DOE beam combiner, these are merely examples of ways in which the invention may be applied. The invention is not limited to these examples, and could be applied to many other environments.

The embodiments described herein are exemplary. Thus it will be appreciated that although the embodiments are described in terms of specific technologies, other equivalent technologies could be used to implement systems in keeping with the spirit of the present invention.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A laser system comprising:
   a plurality of laser sources each producing a respective beamlet, one of said beamlets being definable as a reference beamlet, and all other beamlets being definable as non-reference beamlets;

a beam combiner optically coupled to said laser sources for combining said beamlets into an output beam;

each of said non-reference beamlets exhibiting a respective piston error characteristic, said piston error characteristics producing piston error artifacts in said output beam;

a piston error controller employing a diffractive optical element to measure said piston error artifacts in said output beam and produce a correction signal related to said piston error characteristic of one of said beamlets; and a phase modulator interposed in said one of said beamlets for minimizing said piston error characteristic responsive to said correction signal.

2. The system of claim 1 wherein said piston error controller comprises:

a code generator adapted to produce a respective unique, mutually orthogonal code for each of said non-reference beamlets;

for each of said non-reference beamlets, a modulator interposing said respective code thereon;

a detector system for obtaining a signal derived from said output beam and including information of said piston error artifacts; and a decoder responsive to said signal and adapted to measure for each of said non-reference beamlets the piston error artifact produced as a result of the piston error characteristic of such beamlet as distinguished from those of all other beamlets and to produce a respective piston error correction signal.

3. The system of claim 2 wherein said detector system is interferometer-free.

4. The system of claim 1, further comprising a signal generator producing a phase dither signal, wherein said phase modulator is further responsive to said phase dither signal for imposing phase dither on said beamlet, said phase dither exhibiting a frequency that is the same as that of phase dither imposed on any other non-reference beamlets.

5. The system of claim 2, said detector system comprising:

a beam sampler for obtaining a low-intensity sample of said output beam;

a diffractive optical element responsive to said sample to produce an optical signal representing total piston error in said output beam; and a photodetector responsive to said optical signal for producing an electrical signal representing total piston error in said output beam.

6. The system of claim 2 further comprising:

a signal generator producing a phase dither signal; and wherein said decoder further comprises for each of said beamlets:

a first product detector responsive to a signal representing said measured piston error artifact and said phase dither signal to produce a first detector output signal;

a second product detector responsive to said first detector output signal and said phase dither signal to produce a second detector output signal.

7. The system of claim 2 wherein said decoder further comprises:

a linear transformer responsive to said measured piston error artifact produced as a result of the piston error characteristic of such beamlet as distinguished from those of all other beamlets to apply a crosstalk correction to said respective piston error correction signal.

8. The system of claim 7 wherein said linear transformer is further responsive to an inverse of measured system response to known phase error to apply said crosstalk correction.

9. A method of operating a laser comprising:

producing a plurality of laser beamlets, one of said beamlets being definable as a reference beamlet, and all other beamlets being definable as non-reference beamlets;

producing a respective unique, mutually orthogonal code for each of said non-reference beamlets;

for each of said non-reference beamlets, imposing said respective code thereon; and combining said beamlets into an output beam, wherein each of said non-reference beamlets exhibit a respective piston error characteristic and said piston error characteristics produce piston error artifacts in said output beam.

10. The method of claim 9 further comprising:

measuring using a diffractive optical element said piston error artifacts in said output beam and producing a correction signal related to said piston error characteristic of one of said beamlets;

minimizing said piston error characteristic by phase-modulating said beamlet responsive to said correction signal; and producing a respective piston error correction signal.

11. The method of claim 10 further comprising the step of obtaining a signal derived from said output beam with an interferometer-free apparatus and including information of said piston error artifacts.

12. The method of claim 10, further comprising:

obtaining a low-intensity sample of said output beam;

processing said sample using a diffractive optical element to isolate an optical signal representing total piston error in said output beam;

detecting said optical signal using a photodetector to produce an electrical signal representing total piston error in said output beam.

13. The method of claim 10, further comprising a producing a phase dither signal, and, responsive thereto, imposing phase dither on said beamlet, said phase dither exhibiting a frequency that is the same as that of phase dither imposed on any other non-reference beamlets.

14. The method of claim 10 further comprising:

producing a phase dither signal; and for each of said beamlets, responsive to said measured piston error artifact and said phase dither signal, applying product detection to produce a first detector output signal, and responsive to said first detector output signal and said phase dither signal, applying product detection to produce a second detector output signal.

15. The method of claim 10 further comprising, for each of said non-reference beamlets, applying a crosstalk correction in producing said respective piston error correction signal.

16. The method of claim 11 further comprising:

measuring system crosstalk;

determining an inverse of the measured system crosstalk; and applying said determined inverse of the measured system crosstalk to correct crosstalk affecting said respective piston error correction signal.

17. A method for controlling an error characteristic in a laser system comprising the steps of:

tagging a plurality of beamlets produced by laser amplifiers prior to beam combination with an identification tag;

sampling a combined output beam resulting from combining said plurality of beamlets;

from said sampled combined output beam, using a diffractive optical element to measure a piston error affecting one of said beamlets distinct from piston errors affecting any other of said beamlets;

generating an error correction signal to reduce said piston error of one of said beamlets responsive to said measured piston error; and adjusting a physical characteristic of said one beamlet accordingly to reduce the piston error.

18. The method of claim 17 wherein said measuring step is performed by interferometer-free apparatus.

19. The method of claim 17 wherein said tagging step thereof further comprises amplitude modulating during a period each of said plurality of beamlets with a unique code word orthogonal to any of the code words used to modulate any of the other beamlets during said period.

20. The method of claim 17 wherein said measuring step thereof further comprises applying the sampled combined output beam and the unique code word corresponding to said beamlet to a decoding system.

21. The method of claim 17 wherein said using a diffractive optical element step thereof further comprises:

processing said sampled combined output beam using said diffractive optical element to produce an optical artifact signal representing total piston error in said combined output beam; and converting said optical artifact signal to an electrical signal representing total piston error in said combined output beam.

22. The method of claim 21 wherein said measuring step thereof further comprises:

acquiring periodic samples of the total piston error signal corresponding in time to elements of the unique code word corresponding to the beamlet;

applying the total piston error signal samples and the unique code word corresponding to the beamlet to a decode matrix; and for each temporal instance of the unique code word, calculating the inner product of said code word and those periodic total piston error signal samples corresponding in time to such instance to produce said measurement of the piston error affecting said beamlet.

23. The method of claim 22 wherein said generating step thereof further comprises applying the measured piston error affecting said one beamlet to cascaded product detectors develop the piston error correction signal.

24. The method of claim 22 wherein said adjusting step thereof further comprises adjusting phase of said one beamlet such that the rate of phase change and phase change direction are proportional to the magnitude and sign of the piston error correction signal.

25. The method of claim 17 further comprising applying a crosstalk correction to said measured piston error affecting one of said beamlets distinct from piston errors affecting any other of said beamlets in generating said error correction signal.

26. A laser system comprising:

a plurality of laser sources each producing a respective beamlet, one of said beamlets being definable as a reference beamlet, and all other beamlets being definable as non-reference beamlets;

a beam combiner optically coupled to said laser sources for combining said beamlets into an output beam;

each of said non-reference beamlets exhibiting a respective piston error characteristic, said piston error characteristics producing piston error artifacts in said output beam;

a beam sampler responsive to said output beam to furnish a low-intensity sample of said output beam; and a diffractive optical element responsive to said sample for producing an artifact signal responsive representing total piston error contributions of all of said non-reference beamlets.

27. The laser system of claim 26 further comprising a wedge array adapted to receive said sample and direct it to a face of said diffractive optical element.

28. The laser system of claim 26 wherein said sample contains beamlet samples corresponding to each of said non-reference beamlets;

and further comprising a wedge array adapted to receive said beamlet samples and to direct each of said beamlet samples toward a face of said diffractive optical element along an incident angle with respect to said face corresponding to a diffractive order of said diffractive optical element.

29. The laser system of claim 26 wherein said artifact signal takes the form of a secondary beamlet emitted at a non-perpendicular angle with respect to a face of said diffractive optical element, said angle corresponding to a diffractive order of said diffractive optical element.

30. The laser system of claim 29 further comprising a photodetector arranged to receive said secondary beamlet emitted at said non-perpendicular angle.

31. A method for determining piston error in a laser system comprising the steps of:

providing a plurality of laser beamlets, each laser beamlet having a unique identification; and interfering the plurality of laser beamlets on a diffractive optical element to determine the piston error; producing a phase dither signal; and for each of said beamlets, responsive to a measured piston error artifact and said phase dither signal, applying product detection to produce a first detector output signal, and responsive to said first detector output signal and said phase dither signal, applying product detection to produce a second detector output signal.

* * * * *